United States Patent [19]

Shaw et al.

[11] Patent Number: 5,754,766
[45] Date of Patent: May 19, 1998

[54] INTEGRATED CIRCUIT SYSTEM FOR DIRECT DOCUMENT EXECUTION

[76] Inventors: Venson M. Shaw; Steven M. Shaw, both of 111 Reldyes Ave., Leonia, N.J. 07605

[21] Appl. No.: 514,890

[22] Filed: Aug. 14, 1995

Related U.S. Application Data

[63] Continuation-in-part of Ser. No. 297,409, Aug. 29, 1994, Pat. No. 5,611,038, which is a continuation of Ser. No. 686,773, Apr. 17, 1991, abandoned.

[51] Int. Cl.$^6$ ............... G06F 7/00; G06F 17/21; G06F 17/30
[52] U.S. Cl. ............... 395/200.3; 395/800.01; 707/500; 707/526
[58] Field of Search ............... 395/200.34, 200.47, 395/200.48, 200.49, 610, 601, 602, 603, 604, 615, 761, 777, 778, 794, 792, 779, 780, 782, 784, 788, 791, 800.01, 800.25, 800.27, 800.36; 707/500, 501, 502, 505, 512, 517–525, 526–529

[56] References Cited

U.S. PATENT DOCUMENTS

| | | | |
|---|---|---|---|
| 5,182,709 | 1/1993 | Makus | 395/759 |
| 5,257,186 | 10/1993 | Ukita et al. | 395/793 |
| 5,325,484 | 6/1994 | Motoyama | 395/501 |

OTHER PUBLICATIONS

Yu et al. "Document Architecture Language (DAL) Approach to Document Processing", Document Analysis, 1993 Int'l Conference, pp. 103–106. CD. IEEE/IEE Publications Ondisc.

Boccignone et al. "Building an Object Oriented Environment for Document Processing", Document Analysis, 1993 Int'l Conference, pp. 436–439. CD. IEEE/IEE Publications Ondisc.

*Primary Examiner*—Dinh C. Dung

[57] ABSTRACT

The present invention pertains integrated circuit method and apparatus for achieving the optimum computation performance of document data types. The integrated circuit maintain a digital dictionary for editing, storage, updating, referencing, and retrieval of vocabulary data structure corresponding to selective subject of interest as defined by each user or application. The integrated circuit further directly retrieve, execute, and evaluate the external incoming document according to said selective subject of interest in order to confirm whether the selective user or application have interest in this document. The integrated circuit further directly interpret, and execute the incoming document and the corresponding procedural calls provided particular subject of interest can be confirmed. The present invention produce, maintain, and retrieve user or application specific multimedia reference material for each generic text based document. The presentation further connect with a selective plurality of document and multimedia equipment for the efficient referencing, storage, retrieval, and presentation of the corresponding multimedia object.

5 Claims, 10 Drawing Sheets

INTEGRATED CIRCUIT SYSTEM FOR DIRECT DOCUMENT EXECUTION

This application is a continuation in part of application Ser. No. 08/297,409 file Aug. 29, 1994 now U.S. Pat. No. 5,611,038 which is a continuation of application Ser. No. 07/686,773 now abandoned.

BACKGROUND OF THE INVENTION

1. Field of Invention

The rapid advancement of computer and database has allow human to produce numerous computerized document to date. Meanwhile, progress in electronic communications has further offered the opportunity to make all of these documents remotely accessible via the network.

A typical example is Internet, which millions of document systems containing hypertext information is becoming available during the next decade. World Wide Web (WWW) allows individuals to set up a home page describing each own's document content and particular subjects of interest. Meanwhile, WWW allows individuals to establish hyperlink referring to any relevant document systems on Internet around the world.

However, document systems today still employ traditional computer architecture including RISC (Reduced Instruction Set Computing) or CISC (Complex Instruction Set Computing), which are optimized for data computation, not for document processing. Therefore, proper establishment of these WWW hyperlink and proper identification of the relevant Internet document systems for conforming with individual's particular subject of interest becomes a monumental task, since millions of document search, retrieval, and evaluation operations will be required.

As a result, it becomes necessary to explore a further advanced computing architecture which can be particularly optimized for the efficient processing, storage, referencing, transmission, and retrieval of various document data types.

The present invention is related to integrated circuit system technologies according to a novel Document-Instruction-Set-Computing (DISC) principle.

More specifically, the present invention defines the core functions for DISC integrated circuit to autonomously perform document processing without human intervention. In particular, these DISC microprocessors can effectively perform distributed document storage, processing, transmission, and retrieval operations for Internet based systems, services, and applications including personal communications systems, interactive database, HDTV, object-oriented systems, and multimedia computing devices.

Internet is used to illustrate the performance requirement of real time document processing for very large network and very large database. Our invention is not limited to Internet.

2. Description of the Prior Art

Recent interest for efficient document retrieval on massive computer network such as Internet has triggered the demand to explore on-line autonomous transaction processing and storage system architecture, i.s., referencing, manipulation, or retrieval of electronic document from local or remote host system. This will allow enterprise, consumer, business, educational, military, and medical industries to develop novel Internet system applications employing smart card, personal communications, multimedia, compound document database. However, due to the real-time performance requirement for transaction processing of these document files, novel methods would be required for the effective on-line computation of incoming digital document signals.

Namely, for these new emerging transaction-oriented document processing applications, the signal channels would typically remain silent until the selective authorized users or applications initiated a request for the channel usage in order to perform local or remote access, transmission, storage, or retrieval of the particular document data files. The incoming document signal sequence from the remote or local storage, i.s., file or database, will comprise data in variable block form, which include user identification code, document file description commands, and the relevant content data as organized in paragraph, section, chapter, or other human comprehensive means. Due to the nature that transactions can happen at any time instance, and in a total random fashion, therefore, unless systems equipped with special hardware architectural improvement, it is really not possible to predict, anticipate and schedule these events employing traditional scheduling, optimization, and computation methods as described in the background arts.

Although there are plenty of background arts, such as RISC (Reduced Instruction Set Computing) and CISC (Complex Instruction Set Computing), which taught how to improve the traditional data computation methods and to further apply them for document processing, it is essential to remember their main object is still to improve data computation instead of document processing. For example, the Intel 80×86 and Motorola 680×0 microprocessor families have been evolved over the past twenty years to improve the floating point or fixed point data computation performance through providing architecture and instruction sets improvement on the pipeline of ALU (Arithmetic Logic Unit). As a result, the only possible means for these prior arts to improve document processing performance is through the increase of system clock speed. However, this is not sufficient for the real-time transaction processing performance of document data types.

All of the prior arts methods require the document data signal to be first captured in a continuous bit stream, since they are not able to capture data in variable block size. Next entire command and data content will need to be buffered at a local storage. Finally, the appropriate instruction set will be fetched for execution. These methods, though practical, require expensive high speed processing and memory circuits in order to reach the real time performance. Furthermore, these circuits must be constantly remain active in order to continuously monitor the signal channel for any incoming signal sequence. None of these methods have ever taught how to provide better architectural support and instruction sets for the optimum performance of run-time document data processing, it is conceived that these background arts impose serious cost and power consumption disadvantage for their product implementation, and subsequently limit the market realization potential of these emerging technologies and applications.

Therefore, it would be highly desirable to develop integrated circuit according to a novel computing architecture in order to reach the optimum run-time performance of processing document related data files, this architecture will instead provide much lower priority to traditional data computation task. Furthermore, there is a significant demand for integrated circuit with such capability to be embedded within the document storage, transmission, or processing machines such as printer, copier, scanner, fax machine as a transaction processor engine, and to selectively connect these machines to provide transmission, receiving, manipulation, retrieval, or storage of document data.

A closer look at the document data type reveals that the stream input/output that the prior arts, i.s., CISC, and RISC provide are not appropriate since document data consists of variable size of text data block which is organized in either paragraph, section, chapter, or any other human comprehensive form. Therefore, it would be highly desirable for the integrated circuit to support variable size data block, and to provide capability to parse the entire document into a selective plurality of segments, wherein each segment can be further parsed into smaller blocks in order to search the relevant subject of interest for selective user or applications. As a result, a designated reference engine for corresponding document segment for selective user or applications.

After further examination, it would be highly desirable to allow the integrated circuit to be optimized for the high level programing language based procedural calls. This is because the referencing and parameter passing mechanism between individual document segments are closely resembled to high level programing language procedural calls. As a result, we feel it is most efficient to provide the direct execution capability of these high level language instructions including procedural calls for the optimum performance of document processing.

Furthermore, prior arts in software technology have made significant advancement in the area of database and object-oriented programming, and these technologies have been used extensively for various document related applications. However, conventional CISC and RISC hardware technologies can only provide extremely poor performance to support them. Closer examination reveal that this is because these software technologies do not require heavy floating or fixed point data computation, but relies more on the procedural call processing and referencing.

Finally, digital dictionary have only been explored by prior arts for the learning of foreign language, i.s., the inclusion of audio, video, or graphical script for each vocabulary can significantly assist the human user for the proper spelling, understanding, and pronunciation of each word. However, none of the prior arts make use of the principle of dictionary to make the system or computer to understand a selective collection of subjects of interest for each individual user or applications. N one of the prior arts further provides a flexible interface environment for allowing user or applications to create, delete, augment, or update their subject of interest interactively. It is also our understanding that none of the prior arts have based on the principle of a dynamic dictionary to directly execute high level language instructions for identifying, retrieval, and referencing of the relevant document materials.

OBJECTS OF THE INVENTION

The initial object of the present invention is to develop a novel computing architecture for the optimum run-time performance of processing document related data files, traditional data computation will instead receive much lower priority. As a result, the present invention can interconnect a selective plurality of document storage, transmission, or processing machines and to transmit, receive, manipulate, retrieve, or store document data.

The next object of the present invention is to develop a internal data structure for representing digital dictionary which comprises a selective single or plurality of vocabulary for the particular scoping of subject of interest for each designated user or application during a selective period of time. Said vocabulary can be selectively created, augmented, updated, or deleted by said authorized users or applications.

The other object of the present invention is to develop a novel computing architecture based on the incorporation of internal data structure of said digital dictionary for identifying appropriate document data files which directly or indirectly referring to said subject of interest in order to process, reference, retrieve, manipulate and store relevant document files for selective user or applications.

The further object of the present invention is to develop a novel computing architecture according to the principle of direct execution of high level language based procedural calls or instruction set sequence for the optimum performance of run-time document data processing.

The further object of the present invention is to develop a internal data structure for including a set of procedural calls or instruction set sequence for the run time execution of related external documents for each said vocabulary within said digital dictionary for the particular action requirement for said corresponding subject of interest.

The further object of the present invention is to develop a internal data structure for including a set of high level language based procedural calls or instruction set sequence for the run time parsing, segregation, partitioning, and navigation of related external documents for the referencing and identification of said vocabulary for said subject of interest within said external document files.

The further object of the present invention is to develop a internal data structure for including a set of high level language based procedural calls or instruction set sequence for the run time query, and retrieval of document data in database.

The further object of the present invention is to develop a internal data structure for including a set of high level language based procedural calls or instruction set sequence for the run time representation, query and retrieval of compound document data types according to object-oriented software programming methodology.

The further object of the present invention is to develop a internal data structure for including a set of high level language based procedural calls or instruction set sequence for the run time representation, query and retrieval of multimedia object including video, image, graph for text based compound documents.

The further object of the present invention is to develop a internal data structure for including a set of high level language based procedural calls or instruction set sequence for the run time representation, query and retrieval of multimedia data types for compound documents including video, image, graph.

SUMMARY OF THE INVENTION

Our present invention, DISC (Document-Instruction-Set-Computing) architecture, offers new computing discipline optimized for real time data manipulation and interpretation for compound document related applications. This is totally distinguished from all prior arts which have adapted the traditional CISC or RISC architectural discipline, which are best optimized for real time data computation.

DISC provides new methods and apparatus to organize, store, retrieve, update, and present a plurality of compound document data types. DISC also streamline, optimize, and preschedule these document instruction clusters, and provide parallel or pipeline execution for these instructions. DISC further provides hardware supports for run-time memory and database management, program control, preprocessing and post processing, compression and decompression. DISC can directly query document data from either memory, file, or databases. DISC further sport CISC or RISC application coprocessor to perform traditional DOS or UNIX or alike applications. Finally, DISC provides object-oriented operation system and database interface which can provide concurrent execution of DISC, DOS and UNIX operations.

FIG. 7A and 7B show the architectural principle of DISC. Contrary to a traditional RISC or CISC architecture, the data processors and memory system are completely optimized to facilitate variable sized block oriented data instead of the traditional bit-oriented data streams. To be more specific, data information are organized according to selective internally reconfigurable block format, wherein these internal format can accommodate various processor configurations as well as data throughput. A scalable smart memory system architecture and memory management unit also provides the programmable data block addressing, frame memory management, and associative block search.

In addition, DISC instruction sets can be statically compiled into a set of system look-up tables (SLUT's). Based upon the run time bandwidth constraints caused by either network congestion or application request, the DISC instruction processor can prefetch a group of such DISC instructions, and designate them with various functional units for parallel or pipeline execution. Comparing to the more traditional cache or virtual memory techniques widely used in the existing RISC or CISC computers, the SLUT technique employs intelligent fast associative search scheme, and is able to simultaneously perform prescheduling, compilation, linking, assembling, dereferencing, and issuing instructions for run-time execution, program control, and memory or database management functions.

In a DISC architecture, a scalable smart memory system is connected to the functional units and scalable formatter, which can access, store, and transfer blocks of document data based on the selective internal format.

In FIG. 8, DISC architecture also illustrate an embedded RISC or CISC co-processor element in order to directly execute the bit oriented application programs in DOS, Window, NT, Macintosh, OS2, UNIX, or alike. In a more preferred embodiment, DISC can include a real time object oriented operation system wherein concurrent execution of the application program and real time DISC based document computing can be performed.

DISC architecture provides a single computing platform to support a plurality of supplemental document data types including but not limited to, live motion video, voice, music, still image, and animated graphics. Consequently, it becomes feasible to digitally integrate copy machine, scanner, fax machine, printers, slide projectors, camcorders, television, computers, cameras, telephones, answering machines, and alike, with human users and traditional application program.

BRIEF DESCRIPTION OF THE DRAWINGS

FIG. 7A and FIG. 7B show the core DISC integrated circuit system architecture in accordance with the present invention. Wherein FIG. 7A illustrates how personal database (PDB) can be used to support digital dictionary, FIG. 7B illustrates how DISC can be used to directly execute document data types.

DESCRIPTION OF THE PREFERRED EMBODIMENT

1. General Introduction

Figure 1:
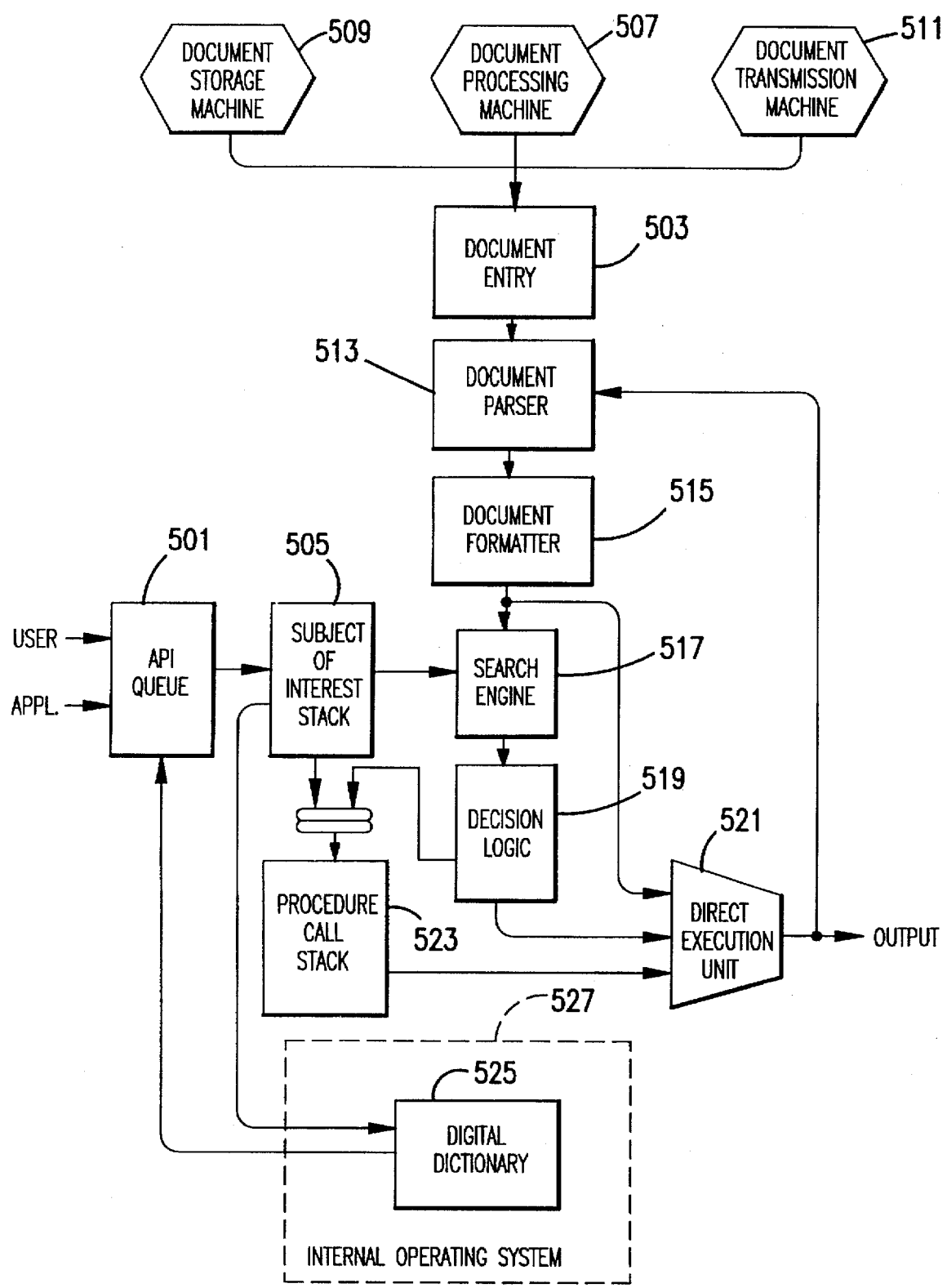
FIG. 1 illustrates how DISC integrated circuit can be used for processing external incoming document according to selective subject of interest collected from selective user or application.
Figure 8:
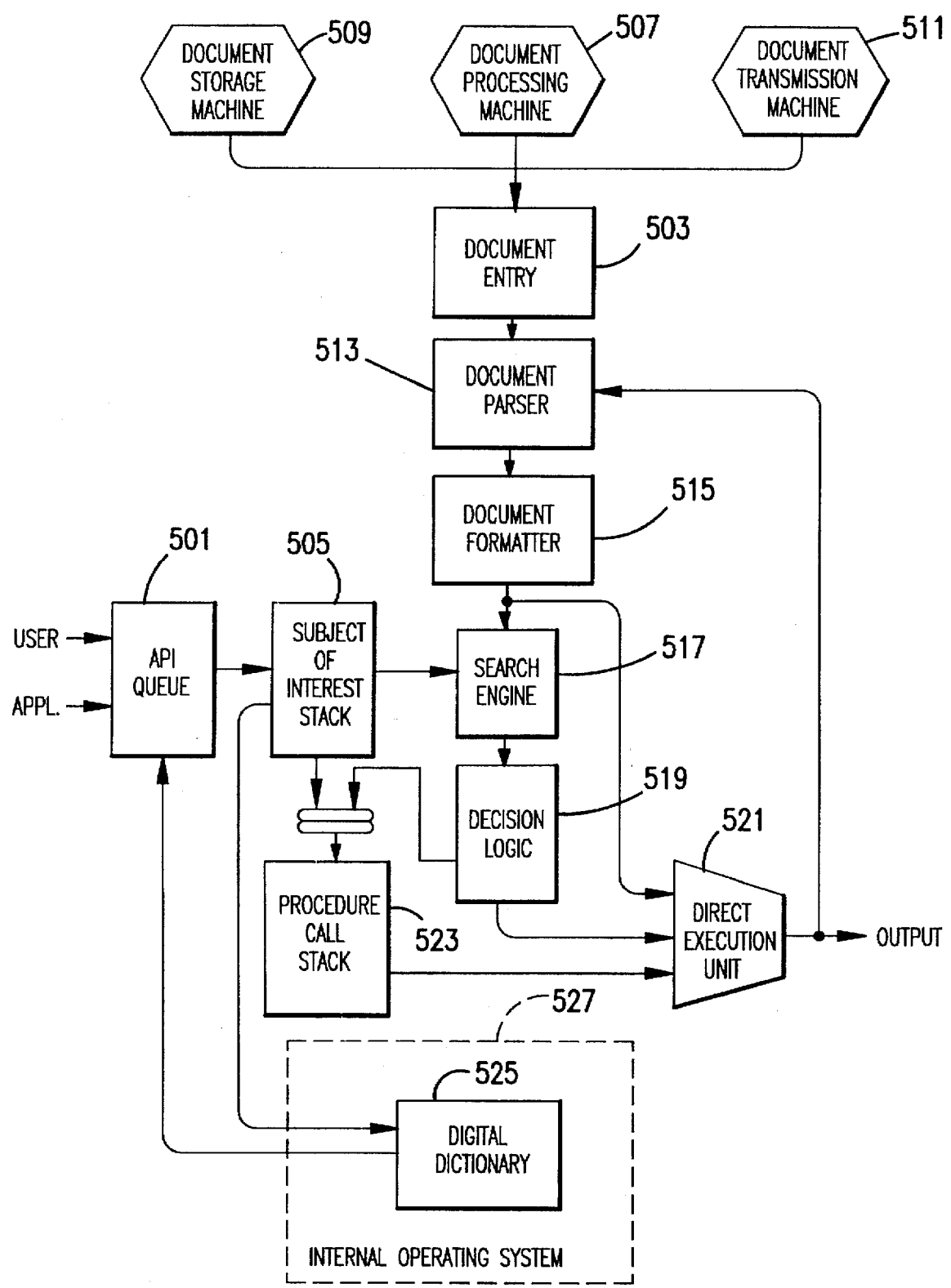
FIG. 8 illustrates the major functional operations for a DISC (Document-Instruction-Set-Computing) integrated circuit in accordance with the present invention.
Figure 9:
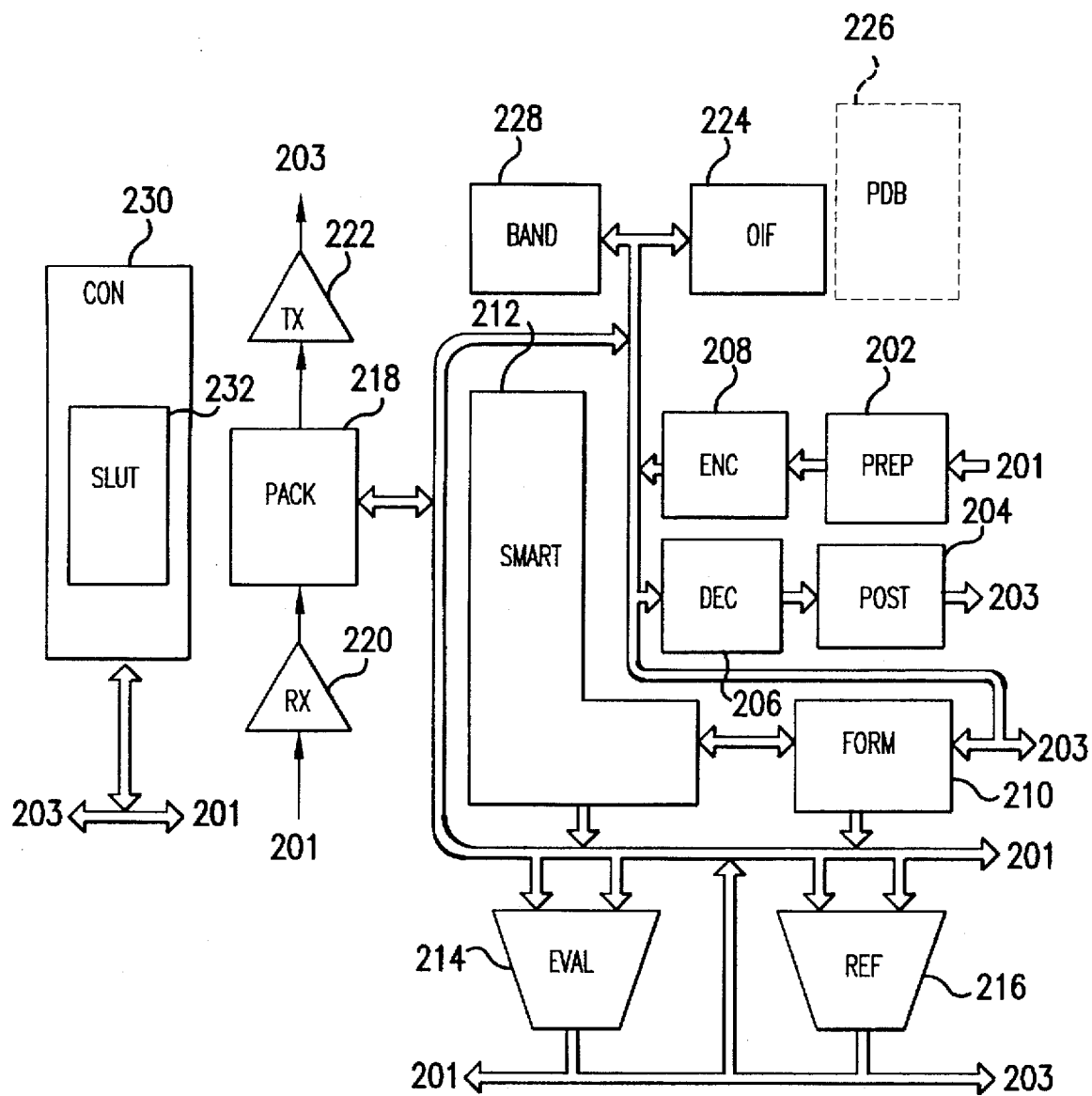
FIG. 9 illustrates the architecture and organization of the present invention and a single chip integrated circuit implementation for compound document computing.

Referring now to the drawings wherein like reference numerals refers to similar or identical parts throughout the several views, and more specifically to FIG. 1 thereof. In FIG. 1 through 5, there is shown how digital dictionary and universal internal representation and formatter can be included for processing external document signal according to selective subject of interest and for processing of external multimedia reference. In FIG. 7 through 9, there is shown how the underline DISC architectural and operational principle can be used to direct execute external document signals for achieving optimum real time performance. In FIG. 6, there is further shown a pictorial representation of a novel integrated circuit DISC (document instruction set computing) system apparatus. There is also shown a pictorial illustration depicting most of the popular business or consumer electronic apparatus relating to computer, communications, and entertainment presently available for the homes or offices. These include a copier, printer, scanner, fax machine, telephone, camcorder, CD player, television, personal computer, and personal communications devices.

It is Applicant's intention to disclose a unified system method towards integrated circuit design of all future interactive document-oriented personal communications and/or computing systems.

It is also Applicant's intention to illustrate the architecture design of a DISC apparatus according to this unified system design method.

Furthermore, the DISC system apparatus allows for compatibility with all existing business and consumer electronic apparatus. DISC user/operator can control, and utilize the functions of each electronic apparatus by means of the DISC system apparatus. The DISC apparatus, being of compact size and shape, similar to that of a VCR, desktop or notebook PC, remote controller, or smaller, can interconnect with all local or remote electronic apparatus, and permit them to function complimentary with each other.

It is yet another Applicant's intention to further substantiate a distributed system architecture for DISC, in which a plurality of DISC's can either locally or remotely communicate with each other and other non-DISC apparatus. Regardless of whether other apparatus were analog, digital, hardware, software, or algorithm, the DISC's can encode, forward, decode, and interpret automatically to the available bandwidth, in a totally integrated system environment.

It is beyond the scope of the present invention to detail all the exact nature and coordination of the system. For example, due to the nature of very large network like Internet, it is obvious that the dynamic management of transmission bandwidth and format incompatibility must be resolved. But details of these operations have been previously disclosed on a copending application, entitled "Audio/Video Transceiver Provided with a Device for Reconfiguring Incompatibly Received or Transmitted Video and Audio Information", filed Apr. 17, 1991, Ser. No. 07/686,773.

2. Overview of System Method

In a more preferred embodiment, as shown in FIG. 1, our invention illustrates how integrated circuit can be used for processing external incoming document according to selective subject of interest collected from selective user or application, wherein API queue 501 is used to collect subject of interest from selective user or application, subject of interest stack 505 is used to assemble data structure comprising a single or plurality combinations of alphabets, character, numbers, sign, or codes. Document Entry 503 is used to connect with selective document processing 507, storage 509, and transmission 511 machines, and collect external document includes form, paper, memorandum, article, book, journal, computer program, or any other readable media. Our invention as previously shown in FIG. 7B further illustrate how integrated circuit can provide hardware architectural support such as Direct Execution Unit 521 for the direct run-time execution of various-size block document data, high level programming language, and database language construct.

In FIG. 1, our invention first teaches how an internal operating system 527 can include a digital dictionary 525 which interfacing with the API Queue 501 for the construction, maintenance, storage and updating of a current list of vocabulary data structure which are directly related to the selective user or applications to be executed during the run-time. This will be elaborated in further details in FIG. 2 later.

Our invention not only teaches how API Queue 501 can communicate with selective single or plurality of user or applications for receiving, prioritizing, maintaining, and updating a collection of data structure defined by user or application. More importantly, our invention teaches how API Queue 501 can be used to collect particular subject of interest referring to a selective time period for selective user or application. Subject of Interest Stack 505 assembles data structure comprising a single or plurality combinations of alphabet, number, character, sign, or code, Subject of Interest Stack 505 further selective schedule, retrieve, and decode said user or application defined data structure. The subject of interests are then sent to the Digital Dictionary 525 for the consideration of updating as part of its current vocabulary.

Our invention also teaches how to design a Procedure Call Stack 523 which produces, maintains, and updates a collection of procedural call or instruction set for the run-time local or remote execution of each user or application defined subject-of-interest data structure. Our invention further teaches how to provide run-time hardware architectural support for including Direct Execution Unit 521 for the direct execution of various-size document data type, high level programming language, and database language construct.

Document Entry 503 selectively connects with plurality of external document storage 509, transmission 511, processing 507, printing, or display machines, Document Entry 503 request and receive from selective connected machines the entire or partial content of an external incoming document, which contain potential or relevant information to said user or application.

Document Parser 513 imports and parses the entire or partial content of said incoming document for corresponding with selective page, paragraph, section, chapter, or other document organization means, wherein said importing content is in nature a variable size data block; said importing content is coded in selective printing or desktop presentation format.

Document Formatter 515 formats said incoming document content in accordance with an internal universal data representation format which correspond with single or plurality entities of alphabet or a single or plurality strings of alphabet, said Document Formatter 515 further selective reformating said incoming document content for producing selective outgoing document content.

Search Engine 517 performs logical or physical searching for said string of user or application defined data structure within said incoming document content. Decision Logic 519 performs the identification, determination or selection of set of proper match.

Figure 2:
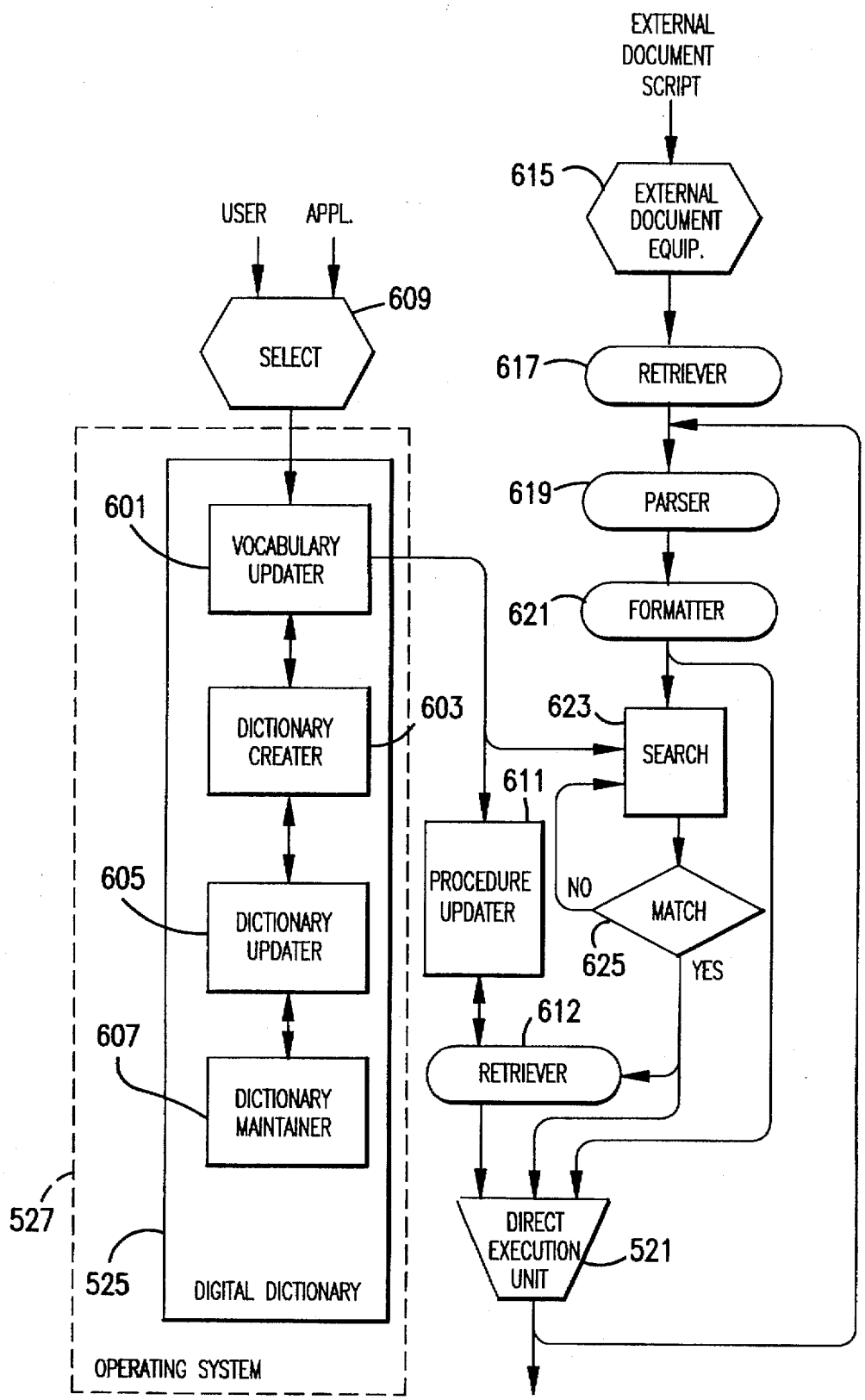
FIG. 2 illustrates how digital dictionary can be included as DISC integrated circuit for editing, storage, updating, referencing, and retrieval of vocabulary data structure corresponding to selective subject of interest as defined by user or application.

Direct Execution Unit 521 performs the direct retrieving, interpreting and executing the corresponding procedural calls or instruction set for said matched user or application defined data structure for selective remote or local run-time manipulation, storage, or retrieval of said document content according to said subject of interest as directed by selective user or application;

In a more preferred embodiment, FIG. 2 teaches how digital dictionary 525 can be used for editing, storage, updating, referencing, and retrieval of vocabulary data structure corresponding to selective subject of interest as defined by user or application, wherein said vocabulary data structure comprises selective single or plurality combination of alphabet, number, character, or code. We further teaches how digital dictionary can communicate with external document database, transmission, storage, or processing machines, and provide hardware architectural support for direct execution of various-size incoming document data types, high level programming and database language construct.

Firstly, internal operation system 527 provides the data structure utilities for creation, updating, maintenance, referencing, and management of a digital dictionary 525.

Secondly, Digital Dictionary 525 can constructs a single or plurality of vocabulary through communicating with selective single or plurality user or applications for receiving, prioritizing, maintaining, or updating a collection of vocabulary data structure defined by said user or application. Each of said vocabulary data structure comprising a single or plurality combinations of alphabets, numbers, or codes, and representing particular subject of interest for said user or application referring to selective time period. Furthermore, Digital Dictionary 525 selectively organize, schedule and retrieve said user or application defined data structure for run time execution.

Thirdly, Digital Dictionary 525 use Procedural Updater 611 in order to produce, maintain, and update a collection of local or remote procedural call or instruction set sequence for the run-time execution of each of said user or application defined vocabulary data structure. Direct Execution Unit 521 allows the access, manipulation, storage, and retrieval of potential relevant various-size document data types according to high level programming or database language construct.

Digital Dictionary 525 selectively connect with a plurality of external document processing, transmission, storage, printing, or display machines 615. A Retriever 617 is used to request and receive from said selective machines the entire or partial content of an external incoming document.

Parser 619 imports nd parse the entire or partial content of said incoming document for corresponding with selective page, paragraph, section, chapter, or other document organization means, wherein said importing content is in nature a variable size data block; said importing content is coded in selective printing or desktop presentation format.

Formatter 621 is used for formatting said incoming document content in accordance with an internal universal data representation format which correspond with single or plurality entities of alphabet or a single or plurality strings of alphabet, Formatter 621 further selective reformat said incoming document content for producing selective outgoing document content.

Searcher 623 provides logical or physical search for said string of user-defined alphabet data structure within said incoming documents for determining or identifying a set of proper match.

Procedure Retriever 612 direct retrieve, interpret, and execute said procedural calls or instruction set for said matched user-defined data structure for selective remote or local run-time manipulation, storage, or retrieval of said subject of interest for said document content. Direct Execution Unit 521 allows the hardware architectural support for direct execution of high level programing or database language instruction.

Figure 3:
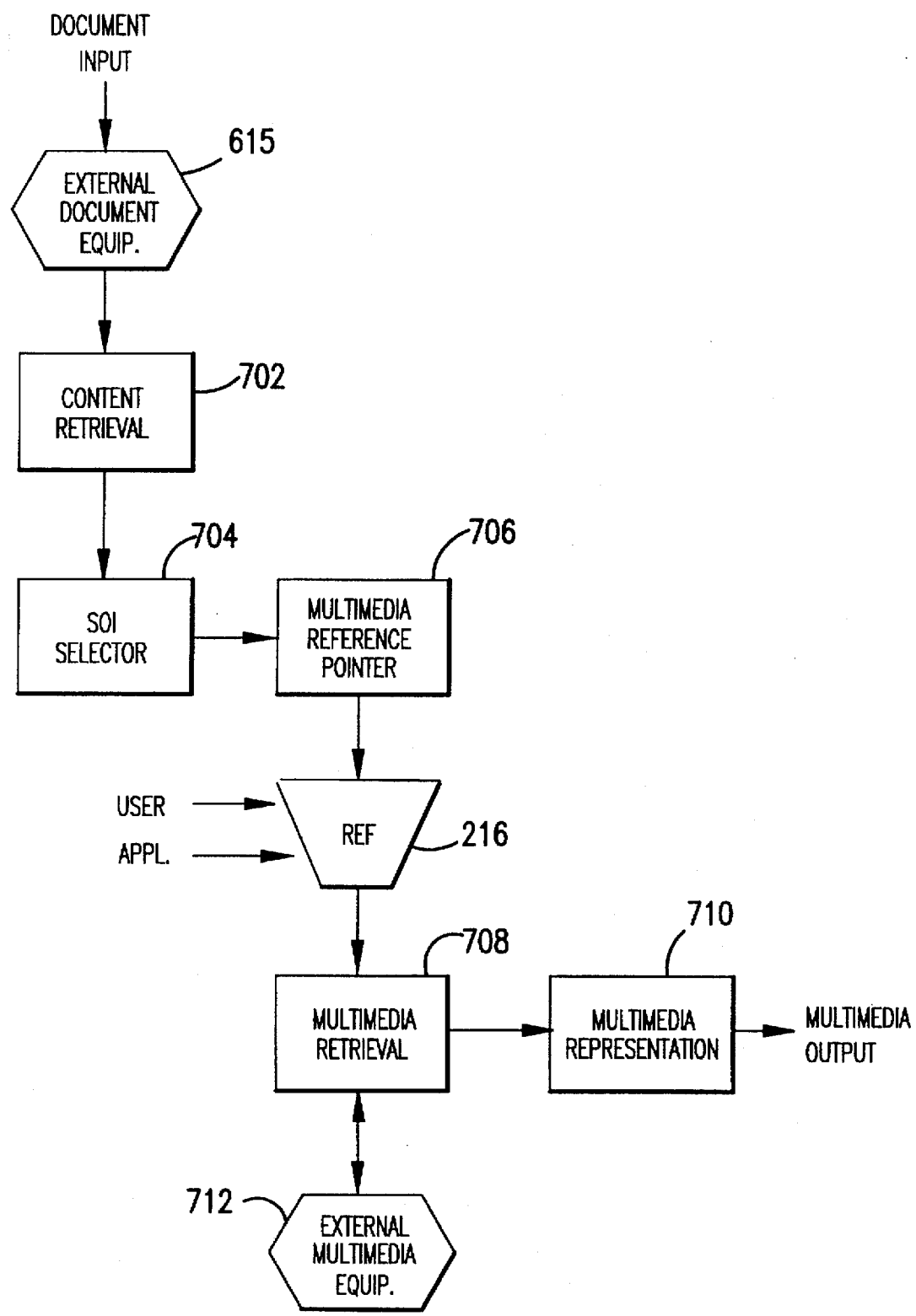
FIG. 3 illustrates how to produce, maintain, and retrieve selective user or application specific multimedia reference material for a generic text based document.

In a more preferred embodiment, FIG. 3 teaches a method for the production, maintenance, and retrieval of selective user or application specific multimedia reference material for a generic text based document.

Firstly, there is Content Retrieval means for input and storing the entire or partial contents of said generic text based documents from the External Document Equipment 615 which comprises document database, transmission, storage, processing, display, or printing machines.

Secondly, there is Subject of Interest (SOI) Selector 704 which produce, preserve, and retrieve the user or application defined data structure comprising a single or plurality combination of alphabets, character, sign, number, or code, wherein each of said combination represents a particular subject of interest for said user or application referring to a selective time period.

Thirdly, there is Multimedia Reference Pointer 706 means which produces a selective multimedia representation or reference material for selective instances of said combination of alphabet, code, character, sign, or number, wherein each said instance correspond with selective user or application during a selective period of time. Furthermore, said multimedia representation can be retrieved from External Multimedia Equipment 712 which further includes selective multimedia database, transmission, storage, processing, display, or printing machines.

Fourthly, there is REF (referencing) 216 means which produces identification or referencing means for selective secure access and retrieval of said multimedia representation for each selective instance of said data structure for each selective user or application.

Fifthly, there is Multimedia Retrieval 708 means which perform run-time referencing of said selective multimedia representation 710 for each instance of said data structure for each selective user or application from selective External Multimedia Equipment 712.

Figure 4:
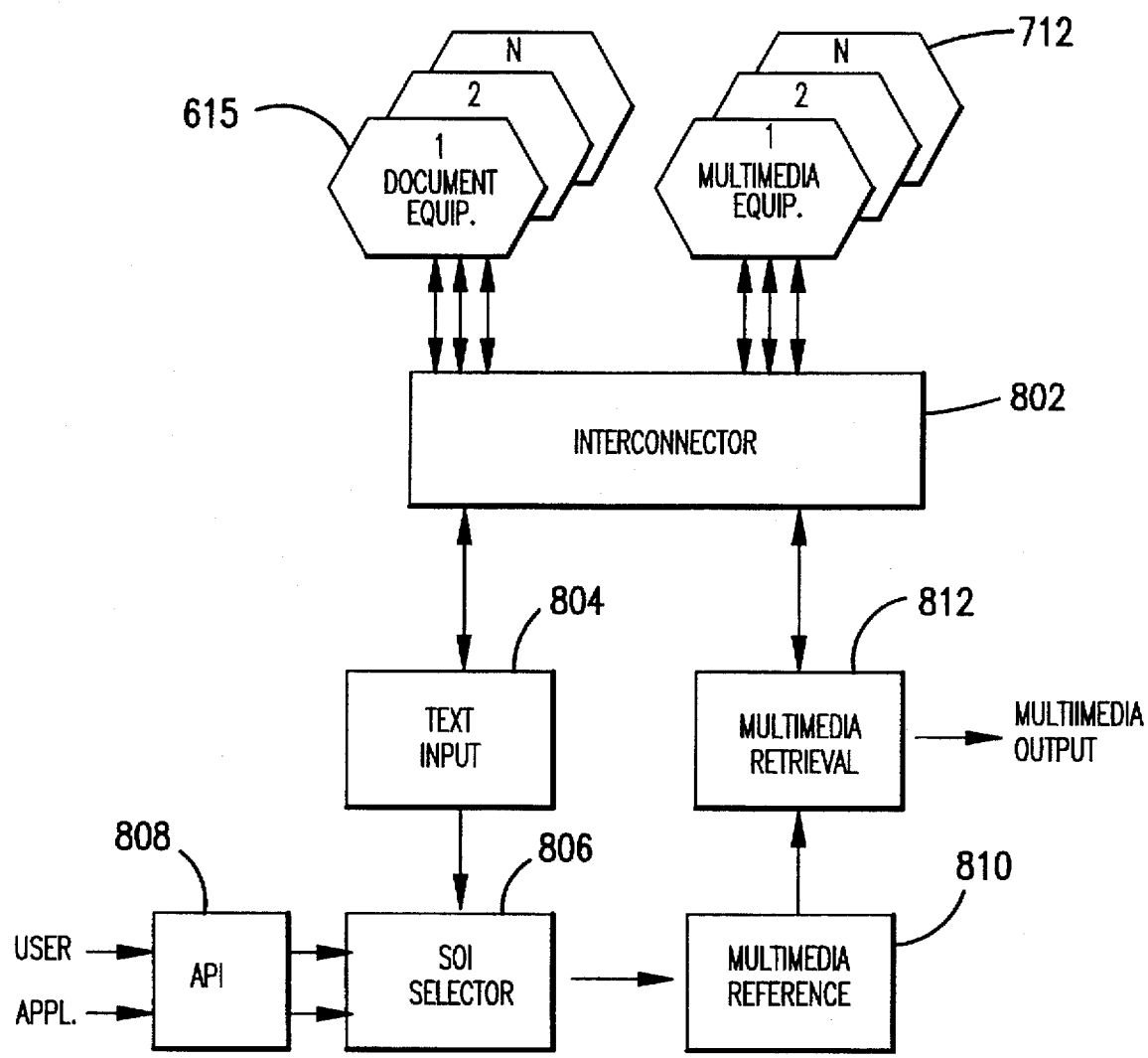
FIG. 4 illustrates how to interconnect a selective plurality of document and multimedia equipment for efficient storage and retrieval.

In a more preferred embodiment, FIG. 4 teaches a method for interconnecting a selective plurality of document and multimedia equipment for efficient storage and retrieval, wherein said document equipment 615 includes a plurality of selective document database, transmission, storage, processing, display, or printing machines; and said multimedia equipment 712 includes selective multimedia database, transmission, storage, processing, display, or printing machines.

Firstly, there in a Text Input 804 means for input and storing the entire or partial contents of said generic text based documents from said document equipment 615.

Secondly, there is Subject of Interest (SOI) Selector 806 which produce, preserve, and retrieve the selective user or application defined text based data structure which comprising a single or plurality combination of alphabets, character, sign, number, or code, wherein each of said combination represents particular subject of interest for said user or application referring to a selective time period.

Thirdly, there is Multimedia Reference 810 means which produce a selective multimedia representation or reference material for selective instances of said combination of alphabet, code, character, sign, or number, wherein each said instance correspond with selective user or application during a selective period of time, said multimedia reference material can be stored, accessed, or retrieved from said multimedia equipment 712.

Fourthly, there is Multimedia Retrieval 812 means which produce, identify, or reference selective secure access and retrieval of said multimedia representation from said multimedia equipment 712 for each selective instance of said data structure for each selective user or application.

Finally, there is run-time referencing means (REF) 216 which reference said selective multimedia representation from said multimedia equipment 712 for each instance of said data structure for each selective user or application.

Figure 5:
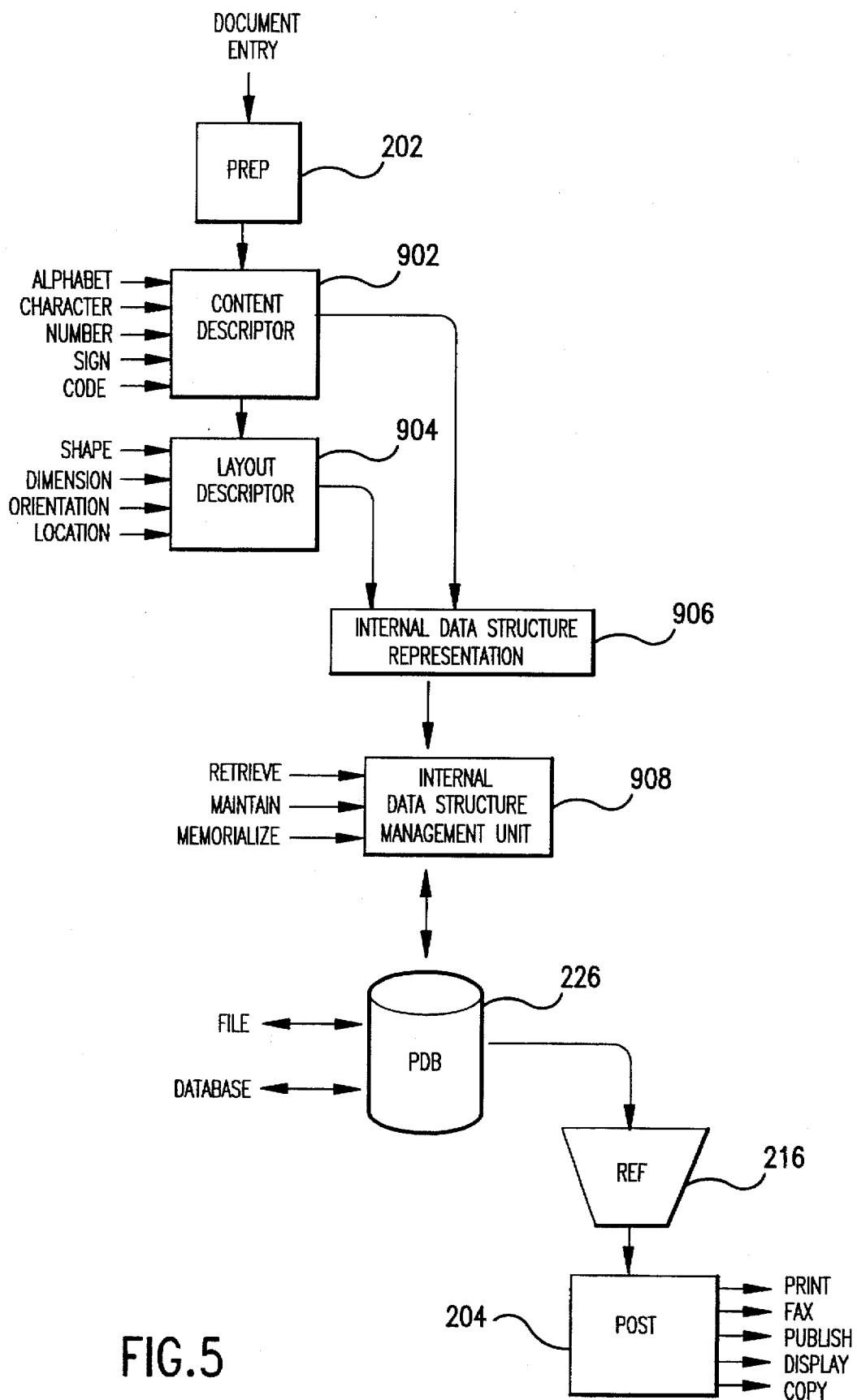
FIG. 5 illustrates how a internal DISC data structure can be used as the universal representation of an arbitrary external computerized document.
Figure 6:
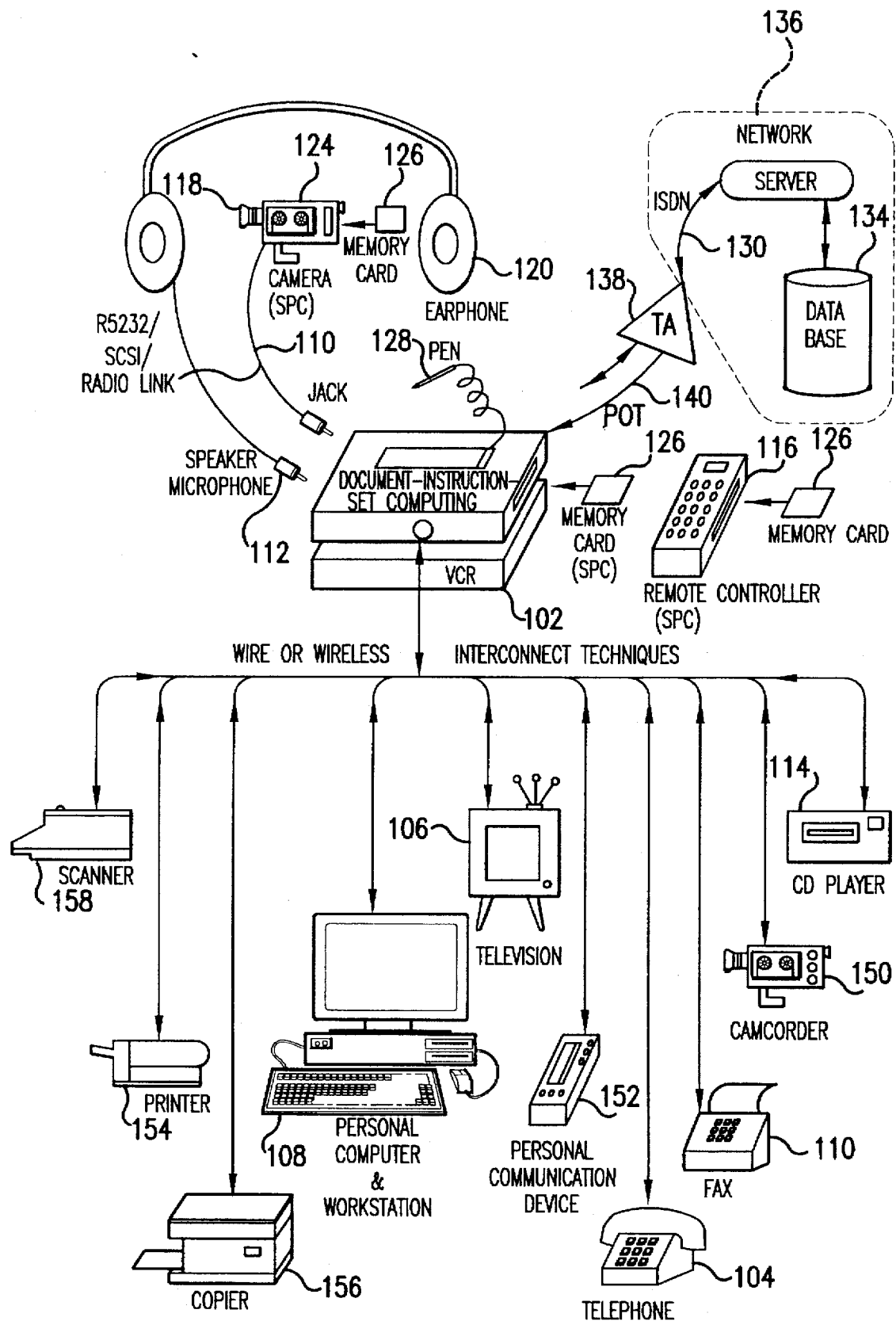
FIG. 6 shows the pictorial illustration of a typical document instruction set computing (DISC) environment.

In a more preferred embodiment as shown in FIG. 5, we teaches a method how to use internal data structure for the universal representation of an external computerized document, wherein said internal data structure can be memorialized, maintained, and retrieved at a remote or local file or database storage, and said external computerized document can be directed for presentation, publishing, printing, faxing, copying, or display.

First of all, there is a Content Descriptor 902 which comprises physical or logical representation of single or plurality combination of alphabet, character, number, sign, or code.

Next, there is a Layout Descriptor 904 which comprises:
a. means for selective describing the physical or logical shape of each said alphabet, character, number, sign, or code;
b. means for selective describing the physical or logical dimension of each said alphabet, character, number, sign, or code;
c. means for selective describing the physical or logical orientation of each said alphabet, character, number, sign, or code;
d. means for selective describing the physical or logical location of each said alphabet, character, number, sign, or code;

Thirdly, there is a Internal Data Structure Representation 906 which comprises said content description and said layout description;

Fourthly, there is Internal Data Structure Management Unit 908 which memorialize, maintain, and retrieve said internal data structure at a remote or local file or database storage location.

Fifthly, there is a POST 204 which produce an external computerized document according to said internal data structure which can be directed for presentation, publishing, printing, faxing, copying, or display;

Finally, there is REF 216 which provides physical or logical identification or reference of said internal data structure from said external computerized document in order to further retrieve said internal data structure.

3. Overview of System Apparatus

Figure 7A:
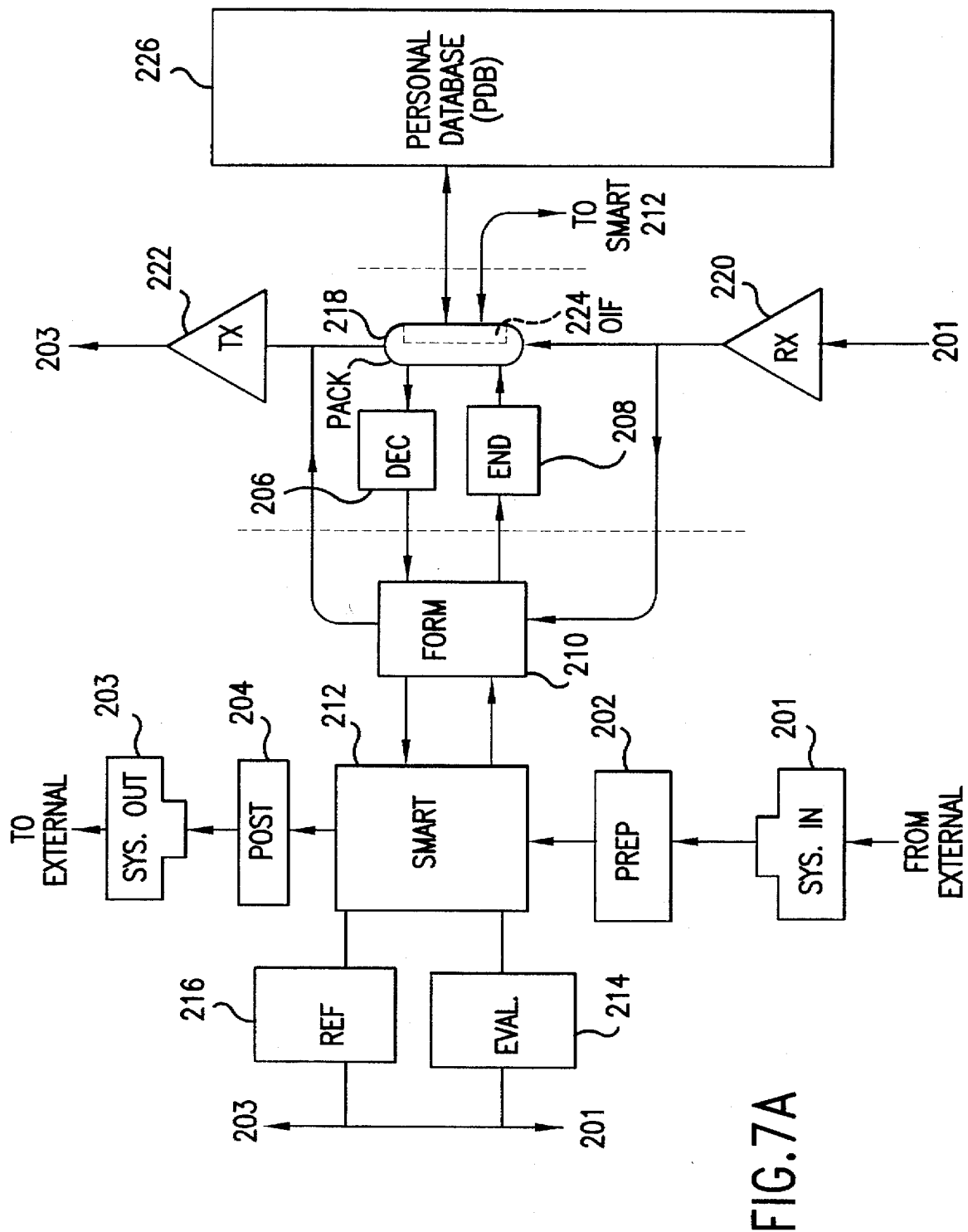
Figure 7B:
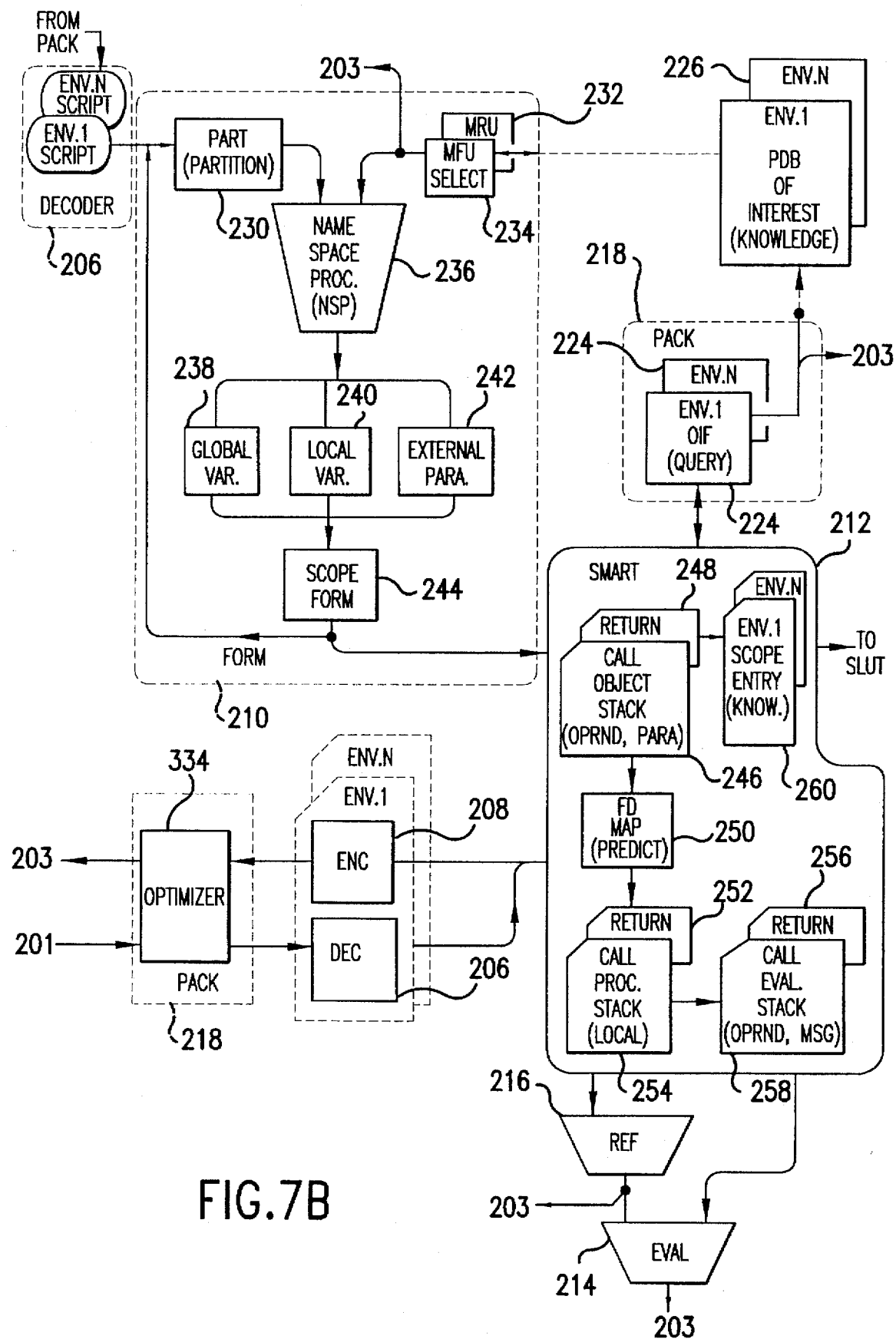

FIG. 7A and FIG. 7B illustrates the core architecture, operation, and methodology for the design and implementation of a DISC 112 integrated circuit computer and communications system.

DISC 112 makes it possible to retrieve, interpret, substantiate, correspond, and maintain a multitude of compound document objects over a wide range of communications networks.

Prior arts in accordance with traditional RISC or CISC methodologies have shown plentiful methods and apparatus to improve individual or selective group of computation tasks such as document compression and decompression algorithms, and bandwidth operability for selective communications networks. However, cost performance for document database and processing applications can be dramatically improved, provided systems have internal ability to retain the initial document request and subject of interest, then accurately search through all possible reference resources and analyze and identify the most suitable target material, finally authorize specific procedural and/or instruction steps for each document request.

As a result, the methodology for DISC 112 becomes intrinsically different. RISC or CISC's primary focus are to optimize run-time computation performance, i.e., instruction authorization, decoding, pipelining, arithmetic and logical execution, and memory control and management. DISC 112 requires and provides additional real time performance for query, reasoning, compilation, decoding, and interpretation of the incoming data streams prior to any instruction authorization or document execution. Comparatively, the RISC and CISC can offer superior performance for numerical intensive data computation applications, wherein DISC 112 is specifically optimized for document retrieval and subsequent procedural authorizations.

Furthermore, prior arts in CISC and RISC only rely on traditional OCR (optical character recognition) techniques to compute, analyze, and recognize characters strings according to individual shapes and contours, whereby DISC 112 allows for 100% recognition for incoming document data through front-end data decoding subsystem and techniques. As a result, the incoming data streams are decoded to selective internal DISC 112 optimized data format, which including but not limit to the 8 or 16 bit universal character encoding forms.

Finally, DISC 112 focus on performance optimization other than the traditional RISC/CISC run-time data computation, DISC 112 subsystems include but not limit to, document identification, manipulation, compilation, encoding and decoding, interpretation, storage and retrieval. Subsequently, all DISC 112 instruction groups are issued and executed to facilitate run-time document manipulation, and to conform specific application, networking, and user priority requests.

The diagrammatic representation illustrated in FIG. 7A comprises the following major system components. They are a personal database (PDB 226 ), a packet processor (PACK 228) a transmission processor (TX 222), a receiving processor (RX 220), a decoding processor (DEC 206), a encoding processor (ENC 208), a formatting processor (FORM 210), a smart memory (SMART 212), a reference processor (REF 216), a evaluation processor (EVAL 214), a preprocessor (PREP), a postprocessor (POST), a bandwidth controller (BAND 228), and a system controller (CON 230).

A. Personal Database (PDB)

In a preferred embodiment, the PDB 226 (personal database) integrated circuit is able to provide an optimized memory storage and management subsystem in order to accumulate, manipulate, store, and retrieve a single or plurality quantities of personal knowledge content corresponding to the selective DISC 112 internal data format signal it receives from PACK 218 (packet processor).

The PDB 226 integrated circuit is comprised of a single or plurality of storage array that is comprised of a single or plurality of memory storage cells. The PDB 226 is also comprised of the sensing, control, management, and interface circuits connected locally and/or remotely to a single or plurality of said storage array which transceive, store, and manipulate single or plurality quantities of said personal knowledge content that is comprised of compound document objects corresponding to said selective DISC 112 internally optimized data format signal. There is also a computation circuit which, when activated, produces logical pointer signal, storage address signal, and/or attribute identifier signal for incoming and/or outgoing said personal knowledge content. The PDB 226 is further comprised of the buffer, register,.and/or stack elements which can store and select said logical pointer, storage address and/or attribute identifier signal to manipulate, prioritize, and retrieve selective said incoming and/or outgoing personal knowledge content. In addition, The PDB 226 is further comprised of the buffer, control, and interface circuit connected locally and/or remotely to a single or plurality of PACK 218 (packet processor) integrated circuit which transceive said personal knowledge content that is comprised of selective said logical pointer, storage address signal, attribute identifier signal, compound document object, and/or corresponding DISC 112 internal data format signal.

In a more preferred embodiment, as shown in FIG. 7B, the PDB 226 (personal database) integrated circuit connected to the OIF 224 (object interface) integrated circuit is further comprised of buffer, control and interface circuits which segregate, partition, and assign individual knowledge content to single or plurality of personal application environments. There is also buffer, control and management circuits which receive and update input request signal, run-time attribute signal, and/or priority signal either locally or remotely from a single or plurality of application, user, and/or communications network.

B. Packet Processor (PACK)

In a preferred embodiment, the PACK 218 (packet processor) integrated circuit is able to transcode and interpret DISC 112 compound document control signals corresponding to selective standard or proprietary protocols for communications, operating systems, text description, database access and/or database management. PACK 218 can also store, relay, translate DISC 112 compound document data signal into single or plurality of frames, packets, cells, or macroblocks corresponding to said standard or proprietary protocols for inbound or outbound communications. Preferably, the PACK 218 is further able to either locally or remotely communicate with external PACK 218's and to perform point-to-point and point-to-multipoint networking sessions, and to interpret and control single or plurality layered signalling data structure.

The PACK 218 is comprised of a single or plurality of protocol controller and data processor connected to the ENC 208 (encoding processor) and TX 222 (transmission processor) integrated circuit which receive an encoded DISC 112 control and data signals from ENC 208 and produce outbound data, control, and maintenance packets, frames, cells, or alike to TX 222 corresponding to selective standard or proprietary protocols for communications, operating systems, text description, database access, and database management which, when activated, including but not limit to, PDL, SQL, Netware, NT, OS2, DOS, UNIX, Q.931, X.25, G3, G4, GSM, CIF, QCIF, SIF, ATM (asynchronous transmission mode) or alike. Said protocol controller and data processor also connected to the DEC 206 (decoding processor) and RX 220 (receiving processor) integrated circuits which receives inbound packet, frames, cells, or macroblocks from RX 220 corresponding to said selective protocols and produce DISC 112 control and data signals to DEC 206 for decoding. There is also a buffer element connected to the TX 222 and RX 220 which transmit and receive document control, maintenance, and data packet, frames, or cells. The PACK 218 is further comprised of a interface, buffer and control circuits connected to FORM 210 and PDB 226 integrated circuit which, when activated, receive DISC 112 internal reformatted document signals from FORM 210 and enable said buffer circuit to transfer and store said reformatted signal into PDB 226. Reversely, said pipeline buffer element further retrieve the internally formatted DISC 112 signal from PDB 226 and translate to said selective protocol formatted packets, cells, frames, or macroblocks for outbound communication.

In a more preferred embodiment, said protocol controller is further comprised of controller element connected via TX 222 and RX 220 to a single or plurality of local or remote external PACK's which establish, maintain, and terminate point-to-point and point-to-multipoint distributed networking sessions, said controller is further comprised of buffer, control and management circuits connected to OIF 224 integrated circuit, as shown in FIG. 2B, which compute input request signal, run-time attribute signal, and/or priority signal either locally or remotely for a single or plurality of application, user, and/or communications network.

In a further preferred embodiment, said protocol control processor element is comprised of a signalling control circuit which transceive a single or plurality of layered signalling data structure corresponding to selective OSI, SS7, TC/PIP or alike, and receives, interpret, or produces a single or plurality of user preference signal, application requirement signal, session control signal, transmission set-up signal, network control signal, logical or physical link setup and termination signal, and/or the alike and translate said signals into corresponding sequence of internal DISC 112 executable procedures or routines.

C. Transmission (TX) and Receiving (RX) Processor

In a preferred embodiment, the TX 222 (transmission processor), and RX 220 (receiving processor) integrated circuit are able to transceive document signal corresponding to a single or plurality of application requirements, networking environments, user priority requests, and run-time bandwidth conditions.

The TX 222 and RX 220 are comprised of a single or plurality pairs of transceivers which, when activated, correspond to a plurality of analog or digital networks which, including but not limited to: ATM, SONET, broadband ISDN, FDDI, MAN, DS3, twisted-pair LAN., coaxial LAN, switch T1, dedicated T1, primary rate ISDN, fractional T1, frame relay, ISDN switched H1, single or dual channel basic rate ISDN, digital switched or private PSDN, analog twist-pair, basic rate ISDN D channel, and wireless communications. The TX 222 and RX 220 are also comprised of sensitizing circuit connected to the PACK 218 integrated circuit which sensitizes run-time networking conditions and produce selective run-time bandwidth allowance signal which, correspond but not limited to: 150 Mbs, 100 Mbs, 45 Mbs, 10 Mbs, 2.048 Mbs, 1.544 Mbs, 384 Mbs, 128 Mbs, 64 Kbs, Px 64 Kbs, 56 Kbs, 19.2 Kbs, and/or 9.6 Kbs.

In a more preferred embodiment, the TX 222 and RX 220 are further comprised of interface and transceiver circuit connected to the OIF 224 via PACK 218 which transmit and receives input request signal, run-time attribute signal, and/or priority signal either locally or remotely for a single or plurality of applications, users, and/or communications network.

D. Decoding (DEC) and Encoding (ENC) Processor

In a preferred embodiment, the ENC 208 (encoding processor) and the DEC 206 (decoding processor) integrated circuit are able to locally and/or remotely encode and decode the compiled high level language procedural modules corresponding to a single or plurality of selective procedural coding algorithms for direct interpretation, execution and manipulation of the source document content. The DEC 206 and the ENC 208 integrated circuit are also able to locally and/or remotely decode DISC 112 data tokens and encode DISC 112 data signal respectively corresponding to a single or plurality of selective compound document data coding algorithms. Preferably, said DEC 206 and ENC 208 can also select said data and/or procedural coding algorithm employing appropriate mechanisms to meet system performance.

More preferably, said DEC 206 and ENC 208 are further able to internally or externally communicate, interface, and perform with single or plurality of software or hardware coprocessor.

The DEC 206 is comprised of a single or plurality of time, pel, and/or frequency domain data decoding circuits connected to PREP 202 and PACK 218 which, when activated, receive local or remote encoded tokens and/or bit-map corresponding to a single or plurality of selective text processor, printer 154, graphic display, fax 110, scanner 158, or copier 156 data format, and convert, transform, and produce source document signal corresponding to selective DISC 112 internal data format.

Said DEC 206's data decoding circuits is also comprised of interface, control, and buffer circuit connected to FORM 210 which, when activated, transfer to FORM 210 said source document corresponding to selective DISC 112 internal data format for further analysis and evaluation.

The ENC 208 is comprised of a single or plurality of high level language procedural encoding circuits connected to SMART 212 which, when activated, receive high level language procedures corresponding to selective source document from SMART 212 and produce direct executable DISC 112 encoded procedures corresponding to single or plurality of procedural coding algorithms. Said ENC's procedural encoding circuit is also comprised of interface, control, and buffer circuit connected to PACK 218 and REF 216 and EVAL 214 which, when activated, transfer said direct executable DISC 112 encoded procedures for remote and/or local interpretation, manipulation, and operation of said source document. Said DEC 206 and ENC 208 are further comprised of pipeline buffer and processing circuit connected to POST 204 and PREP 202 which, when activated, respectively produce and receive compatible output and input signal for single or plurality of computer 108, communications, and entertainment equipment, which include, but not limit to, copier 156, printer 154, scanner, fax 110 machine, telephone 104, camcorder, CD player, television 106, personal computer 108, and personal communications devices.

In a more preferred embodiment, as shown in FIG. 7B, said ENC's and DEC 206's procedural encoding and decoding circuits are further comprised of application/task queuing circuit connected to SMART 212 and CON 230 integrated circuit which, when activated, look-ahead fetch and retrieve selective group of precompiled and directly executable procedural to selectively control and manipulate said compound document in a single or plurality of application environment. Said DEC 206 and ENC 208 are further comprised of a single or plurality of time, pel, and/or frequency domain data decoding and encoding circuits connected to PACK 218 which, when activated, retrieve and produce respective decoded DISC 112 signal and encoded DISC 112 tokens correspond to a single or plurality of time, pel, and/or frequency domain coding algorithms, and for a single or plurality of compound document data types which, including but not limit to text, ASCII data, audio, image, graphics, and video. Said ENC's and DEC's procedural and data processing circuits are further comprised of a pipeline buffer circuit connected to SMART 212 and PACK 218, which when activated, either receive encoded tokens from SMART 212 or PACK 218 for decoding, transfer decoded or encoded signals and procedures to SMART 212 for local storage, or relay decoded and encoded document to PACK 218 for remote application.

In a further preferable embodiment, The DEC 206 and ENC 208 are further comprised of interface circuit connected to CON 230 which, when activated, internally or externally pipeline, cascade, or parallelize a single or plurality of hardware or software coprocessor modules and decode and encode selective algorithm at selective subline, line, group of lines, area of interest, block, macroblock, group of block, partial frame, whole frame, or group of frame image level to meet system performance.

E. Formatting Processor (FORM)

The FORM 210 (formatting processor) integrated circuit is able to retrieve single or plurality set of source documents, query PDB's personal knowledge content, and search through and locate said document's potential area of interest. In addition, the FORM 210 is also able to retrieve PACK's run-time attribute signals of said input document, static and/or dynamically compute the communication, processing, and storage bandwidth requirement and allowance signal, and establish selective DISC 112 internal signal format corresponding to available run-time processing capabilities. Preferably, the FORM 210 is further able to receive, schedule, and optimize a single or plurality of high level language and database query procedures from SMART 212 integrated circuit corresponding to said document's area of interest.

As shown in FIG. 7B, the FORM 210 is comprised of input receiving circuits connected to DEC 206 which receive a single or plurality of fully decoded document scripts and/or their reference pointers, wherein said document script correspond to selective internal DISC 112 format and allow for 100% text recognition and achieve significant content compression and representation. Said input receiving circuit is further comprised of partitioning circuit (PART 230) which parse and organize said document into entities comprising of a single or plurality of sentence, paragraph, page, chapter, or other physical or logical segmentation means. There are also database query input (SELECT) circuit connected to PDB 226 which receive personal knowledge content correspond to selective most-frequently-used (MFU) or most-recently-used (MRU) algorithms.

In addition, the FORM 210 is comprised of a name space processor (NSP 236) which is further comprised of input circuit connected to PART 230 (text partitioning) circuit which, when activated, receive said segmented document. Said NSP's input circuit further connected to said SELECT (database query) circuit which, when activated, receive selective area of PDB's knowledge content. Said NSP 236 is further comprised of a single or plurality of iteration and/or parallel processor means which compare, locate, and produce selective area of interest for each segmented document script. Said NSP 236 processor means further establish a scope content for each script which comprising a single or plurality of global and local variables and parameter set, wherein said global variables correspond to common subject of personal interest, said local variable correspond to particular subject of interest for specific application environment, and said parameter set correspond to the selective run-time referencing and communication pointers between segmented scripts. There is also a scope controller (SCOPE 244) circuit connected to NSP 236 which, when activated, formulate and buffer said scope content for each corresponding segmented script. Said SCOPE 244 (scope controller) circuit is further comprised of loop-back circuit which, when activated, transfer said scope content to said PART 230 (partition) circuit and further parse said segmented script.

The FORM 210 is further comprised of a processor element connected to the PACK 218, which when activated, receive run-time bandwidth attribute signals corresponding to selective application, networking, and execution environment and produce processing and storage bandwidth requirement and allowance signal, said processor element further produce selective DISC 112 internal signal format corresponding to available run-time processing capabilities.

In a more preferred embodiment, there is also interpolating and extrapolating processor circuit connected to the PACK 218 which, when activated, receive run-time attribute signals corresponding to a local or remote differential compound document and corresponding motion vector for its video script, and static look-up, formulate, and produce internal data structure corresponding to pre-assigned system clock and SLUT 232 parameters. The FORM 210 is further comprised of a dynamic program scheduler and optimizer circuit connected to PACK 218 which, when activated, receive run-time alert signal and further reformat said signals corresponding to run-time user, application, and networking conditions. There is further a prescheduler circuit connected to the ENC 208 and DEC 206 integrated circuit which optimize, partition, and produce a coherent procedure flow for the selective sequential, pipeline, or parallel encoding and decoding of said document signal.

In a further preferable embodiment, the FORM 210 is further comprised of a scaling circuit connected to the SMART 212 (smart memory) integrated circuit, which invoke system calls and dynamically adjust system clock rate, aspect ratio, and SLUT 232 parameters to provide a linearly scalable DISC 112 system performance. There is also a scheduler and optimizer circuit connected to SMART 212 which when activated, statically and/or dynamically receive, schedule and optimize a single or plurality of high level language and database query procedures from SMART 212 and partition them into a single or plurality of program control signaling modules corresponding to sequential, pipeline, and/or parallel encoding and decoding of said document signal.

F. Smart Memory (SMART)

In a preferred embodiment, as shown in FIG. 7B, the SMART 212 integrated circuit is able to establish a single or plurality of independently compiled high level language procedures modules, wherein each module represent the query, manipulation, and retrieval of a single or plurality of segmented script located within the source document, each script further correspond to a single or plurality of subject of interest specified by the user, application, and/or network. The SMART 212 can also allow a single or plurality of human, computer 108, and/or machine to specify said subject of interest, and to accommodate changes of run-time environment for selective user, application, and networking conditions, it further allow for sequential or parallel access, manipulation, and processing of said compiled procedural modules.

The SMART 212 is comprised of a single or plurality of object stack (OSTACK) connected to the FORM's scope controller (SCOPE 244) circuit which, when activated, receive a single or plurality hierarchy of scope content signal corresponding to selective subject of interest at each level and further selective detailed subject of interest at the subsequent level, said OSTACK is also comprised of input interface circuit connected to OIF 224 circuit which, when activated, receive selective recommendation from application, user, and/or network and further produce a single or plurality list of subject pointer signals that is further comprised of level index field, subject index field, and identifier field, wherein said level index field correspond to the selected number of hierarchy level, said subject index field correspond to the selected number within said level of hierarchy, and said identifier field connected to a decoder further correspond to the coded name of the selected subject of interest.

Said OSTACK is further comprised of storage, control, and pipeline buffer means, wherein said storage means is comprised of a single or plurality of register, memory and/or storage array for storing said list of selected subject pointer signals, said controller means is further comprised of program counter logic and data register means wherein program counter logic calculate the pointer address within said list for the next cycle's top of stack (TOS) pointer location, data register means retrieve and store the next cycle's TOS pointer data content. In a more preferred embodiment, a pipeline buffer means connected to system controller (CON 230) integrated circuit is further included which, when activated, additionally store a single or plurality of selective TOS address and data content for the present and a plurality of past and future operation cycles, which cooperate with CON 230 to perform scheduling, planning, and pipeline control. There is also next script pointer and controller which, when activated, produce a single or plurality chain of pointers that is further comprised of the entry location, descriptor and/or attributes of the next segmented document script for the next selected subject of interest.

There is also a next environment pointer (NEXT) circuit which, when activated, produce a single or plurality chain of pointer descriptors for the next cycle of execution environment and provide mapping of selective run-time environment for said user, application, and/or network to selective area of interest. The NEXT (next environment pointer) is comprised of subject field, attribute field, script field, and status field, wherein said subject field correspond to the next selected subject retrieve from the OSTACK's list of interest, said attribute field correspond to the current run-time environment signal which it received from CON 230 for presume and continue the current network, user, and application conditions, said script field correspond to the next segmented script which further correspond with the next selected subject of interest, and said status field is further comprised of next cycle environment call type, previous environment call type, next subject data type, and masking and control sub-fields, wherein environment call type identify whether the previous and next cycle of run-time execution require to invoke and enter into another internal or external calling procedure, to return and exit from the present called procedure, or to simply remain within the same procedure and perform further operation. Furthermore, the data type identify whether the next subject of interest is a global variable, a local variable, a parameter, or a label. Finally, the masking and control sub-field determine whether the next subject is executable or not.

The SMART 212 is further comprised of scope entry logic (ENTRY) circuit connected to OSTACK and OIF 224 which, when activated, receive from OIF 224 the input direction for selective user, application, and/or network and construct a single or plurality of knowledge representation which is further comprised of state machine, flow chart, chain, graph, table, or other equivalent representations for user, machine, and/or application to assign scope boundary for each segmented script and to access and utilize the corresponding subject of interest. Said ENTRY circuit is further comprised of buffer element which sequentially or parallelly store said corresponding knowledge representation path for said scope content signal. In addition, said ENTRY is further comprised of circuit which produce a single or plurality of chain of reference pointers and allow single or plurality of run-time environment including user, application, and/or network to select specific knowledge path and to browse through the corresponding document scripts.

More preferably, said ENTRY is further comprised of run-time attribute pointer and control circuit which, when activated, produce a single or plurality of chain of attribute pointers which provide alternative mapping of said user, application, and/or network to a single or plurality of document script and corresponding area of interest and accommodate on-line run-time environment changes including application request, user priority, and/or network bandwidth shortage.

In addition, the SMART 212 is comprised of frame differential bit maps (FDMAP 250) circuit that is further comprised of a single or plurality of subject map signal, script map signal, status field, and frame difference control field, said subject map signal is comprised of the horizontal and vertical coordinates of the selected subject of interest, said horizontal coordinate represent the selected level within the hierarchy of interest and said vertical coordinate represent the select subject index within that level. Said script map signal is comprised of coordinate pair for the two dimensional row and column representation of the corresponding segmented script, wherein each horizontal coordinate is assigned to a independently compiled external procedure, each corresponding vertical coordinate is further assigned to any of its internal procedures. There is also a pointer control circuit which logically interconnect multiple rows and/or column in order to allow nested internal and external procedural calls among each other. Said Status field further indicate said FDMAP 250 is for a selected present, previous, or future operation cycle. Said frame difference control field is further comprised of a single or plurality of status, program-flow control, and memory management of said procedure and its segmented document script for selective run-time environment.

Said FDMAP 250 is further comprised of a PREDICT circuit connected to CON 230 integrated circuit which compare multiple frames of said FDMAP 250, identify frame differential information, predict run time environmental changes, and acknowledge and make recommendations to CON 230 to avoid pipeline break.

The SMART 212 is further comprised of program control means connected to PREDICT which is comprised of a single or plurality of procedure call (PCALL) stack and procedure return (PRETURN) stack. Said PCALL stack is comprised of procedural control means which receive grant signal from PREDICT and prepare ahead of time a plurality of forthcoming program control steps and activation record according to a regular plan-ahead procedure control mechanism, said PRETURN stack is comprised of procedural control means for all the exception situations which receive PREDICT's control alert signal that next operation cycle require the activation and access of a previous activation record environment. Said PRETURN then prepare ahead of time and fetch the selected previous activation record from PRETURN stack and prepare special procedural control instruction accordingly.

The SMART 212 is further comprised of operator and message control means connected to PREDICT which is comprised of a single or plurality of evaluation call (ECALL) stack and evaluation return (ERETURN) stack. Said ECALL stack is comprised of storage and control means which receive grant signal from PREDICT and prepare ahead of time a plurality of forthcoming operation and message control steps according to a regular plan-ahead flow control mechanism, said ERETURN stack is comprised of storage and control means for all the exception situations which receive PREDICT's control alert signal that next operation cycle require the invocation and access of a exception operation and/or message control environment. Said PRETURN then prepare ahead of time and fetch the selected exception operation and/or message control operator from PRETURN stack and prepare special procedural control instruction accordingly.

G. Reference Processor (REF)

In a preferred embodiment, the REF 216 provides an fully optimized object-oriented data access facility which can further reference and retrieve the locally or remotely stored script data content corresponding to selected subject of interest, run-time environmental conditions, and user, application, and network request. Per further request, REF 216 can also reference and retrieve the corresponding audio, graphical, and/or video script for selective user, application, and network environment.

The REF 216 can also provide a selective set of alternative pointer referencing means in order to dynamically move, overlay, rotate, enlarge, or reduce a stored compound document objects and its motion video, audio, and graphical script without physically modifying or relocating its corresponding storage address and data content.

The REF 216 is comprised of pointer translation circuit connected to the SMART 212 which receive selected next subject pointer signal and current environment pointer signal and produce the corresponding next segmented script pointer, the REF 216 is also comprised of a address preparation processor connected to said translation circuit which receive next script pointer signal and physical and/or logical base address pointer, and selectively produce effective address pointer signal, logical address pointer signal, or physical address pointer signal. REF 216 is also comprised of data referencing and buffer circuit which send said address pointer signals and reference and retrieve the next corresponding segmented script content. In addition, REP 216 is further comprised of interface circuit connected to OIF 224 which receive user, application, and/or network's request signal and further produce and send supplemental address pointer signals to retrieve additional audio, graphical, and video script, which can be further comprised of a single or plurality of still image background object, and motion video foreground objects corresponding to said subject of interest.

More preferably, REF 216 is further comprised of a single or plurality of pointer manipulation circuit connected to the ENC 208, DEC 206, CON 230, POST 204, and PREP 202 integrated circuits, which receives run-time requests to move, overlay, rotate, enlarge, or reduce a single or plurality of stored document objects, and produces the appropriate alternative referencing parameters to dynamically modify the access address pointer and to manipulate these objects without physically modifying or moving their address and data content.

There is also a run-time adaptive decision-logic circuit connected to the CON 230 and ENC 208, which receive selective run-time bandwidth variables correspond with user, application, and networking conditions, and produces alternative access referencing pointer to select alternative script data content in order to accommodate run-time processing, storage, and/or transmission bandwidth constraints.

H. Evaluation Processor (EVAL)

In a preferred embodiment, the EVAL 214 is able to perform arithmetic and logic operation for the selected script data content according to the encoded and directly executable high level procedural operations.

The EVAL 214 is comprised of data buffer and interface circuit connected to REF 216 which receive and store data content signal for the selected script. There is also instruction buffer and interface circuit connected to ENC 208 which receive and store directly executable encoded high-level instructions. The EVAL 214 is further comprised of a single or plurality of arithmetic and/or logic circuit which sequentially or parallelly process said data content according to said instruction content.

More preferably, the EVAL 214 is comprised of program storage circuit which store a single or plurality sequence of directly executable routines. There is also a interpreter buffer and processor circuit connected to the SMART's ESTACK (Evaluation Stack) which receive high level language operations and directly interpret to executable instructions according to said microprogram routines. There is further interface and buffer circuit which selectively load a microprogram from a plurality of resources and to update the interpreter storage content corresponding to run-time user, application, or network request, reconfiguring and reformatting instruction sequences for a local or remote RISC or CISC host machine, or transmit said executable instruction sequence either remotely or locally to a single or plurality of host machine for further execution.

I. Preprocessor (PREP)

In a preferred embodiment, the PREP 202 (preprocessor) integrated circuit is able to receive input request from user, application, and network and import and retrieve source document script from local sensor, storage, and processor device and perform selective preprocessing functions In a further preferred embodiment, PREP 202 is further able to capture, preprocess, differentiate, and generate compound document script with motion vector and/or frame differential signal for video, image, audio, and/or graphic input files.

The PREP 202 is comprised of interface and buffer means connected to OIF 224 which, when activated, receive local input request signal from a single or plurality of user, application, and/or network. The PREP 202 is further comprised of receiver connected to input sensor which selectively receive electronic signal corresponding to selective binary bit-map image format and/or electronic document format corresponding to fax machine, word processor, electronic mail, database, spreadsheet, desktop printing, and/or desktop publishing. The PREP 202 is further comprised of or interfaced with processor circuit that is comprised of video capturer and/or bit map graphics adaptor, said capturer produces digital video signal corresponding to external RS-170, NTSC, PAL, SCAM or alike video formats. Said bit map graphics adaptor produces digital input signal corresponding to animated graphics and/or still image input file corresponding to PCX, GIF, EPS, TIFF, or alike format.

There is also a single or plurality preprocessing circuit connected to SMART 212 which, when activated, receive instruction from SMART 212 and perform selective function include, but not limit to linear and/or nonlinear filtering, noise reduction, edge detection, thinning, segmentation, pattern matching, and character recognition. said pattern matching and character recognition circuit are further comprised of decision logic circuit which produce selective confidence level corresponding to the uncertainty and error possibility of the partially recognized or matched input image. There is further interface circuit connected to OIF 224 which allow user to interactively edit, verify, and correct if error happens.

More preferably, the PREP 202 is further comprised of or interfaced with a single or plurality of special purpose macroblock-oriented integrated processor and memory array circuit which is specifically designed to optimize the performance of transferring, storage, retrieval, and processing of said input digital signal corresponding to CCITT CIF, SIF, QCIF, or alike macroblock format. Said macroblock processor and memory circuit further produce and store a single or plurality differential frame signal and a motion vector signal corresponding to the sequentially received frames of motion video, still image, or animated graphic files.

Further preferably, the PREP 202 is further comprised of a single or plurality of integrated and pipeline analog and/or digital sensor, processor, and memory array, wherein said sensor element produces the required inputs corresponding to the energy it received, said processor and memory directly receive and efficiently process said analog or digital signal without further latency or bandwidth constraints.

J. Postprocessor (POST)

In a preferred embodiment, POST 204 is able to receive request from user, application, and/or network and perform selective postprocessing functions and convert output signal to bit maps image and/or electronic file format for external printer 154, copier 156, pager, display, television 106, fax 110, computer 108, entertainment and/or communication devices, and in a more preferable embodiment, the POST 204 is further able to output the corresponding compound document script including video, image, audio, and/or graphics.

The POST 204 is comprised of interface circuit connected to OIF 224 which receive input request from a single or plurality of selective user, application, or network. The POST 204 is also comprised of buffer element connected to DEC 206 which retrieve and store said DISC 112 internal formatted signal. There are also a single or plurality of display adaptor (Da) and a print/fax/copier adaptor (Pf) circuits connected to said buffer element which receive DISC 112 internal formatted signal, said Da output adapting circuit produces a VGA, RGB, or NTSC compatible output signal to further display live video, animated graphics, and/or sequential still image. Said Pf adaptor circuit further produces a G3, G4, TIFF, PCX, EPS, GIF or alike output file in order to further print, fax 110, or copy the corresponding compound document for live video, still image, audio, and/or animated graphics. There is further single or plurality of processor circuit connected to SMART 212 which receive instruction from SMART 212 and perform selective post-processing functions to further improve and enhance quality of the output image signal.

K. Bandwidth Controller (BAND)

In a preferred embodiment, the BAND 228 integrated circuit is able to compute the required communication bandwidth for a local or remote digital video signal and generate a list of run-time attributes for the appropriate compression ratio, frame rate, and display resolution. The BAND 228 is also able to sensitize run-time networking traffic conditions, and dynamically configure the aforementioned run-time attributes corresponding to the available run-time communication bandwidth. The BAND 228 is further able to sensitize user input, network, or application-specific requirements and interactively update the aforementioned run-time attributes. Preferably, the BAND 228 is further able to exchange a variety of digitally encoded input and output foreign document signals corresponding to intrinsically incompatible document coding algorithms whereby incompatible transmission, storage, retrieval, printing, publishing, and display apparatus can inter-operate through such interface.

The BAND 228 is comprised of a look-ahead-pipeline processor element connected to the PREP 202 and RX 220 integrated circuit, which receives a local or remote inbound differential document signal and motion vector, it then calculate and produce a corresponding run-time attributes signal. The BAND 228 is also comprised of a controller element connected to the FORM 210 (formatting processor), ENC 208 (encoding processor) and CON 230 (system controller), which receives a set of initial run-time attributes according to the algorithmicly pre-determined default parameters retaining within the SLUT 232 (system look-up-table). Provided said document signal is requested by the CON 230 for outbound transmission. The BAND 228 is further comprised of a sensitizing circuit connected to the TX 222 (transmission processor), which can intelligently analyze a plurality of networking traffic conditions, and dynamically configurate the run-time attributes corresponding to the available communication bandwidth. The aforesaid sensitizing circuit will first initiate a request signal sending to the TX 222 along with the required communication bandwidth data, it will then either receive a grant signal from the TX 222 provided the network condition is sufficient, or TX 222 will issue a run-time bandwidth allowance signal to BAND 228 corresponding to the realistic network traffic condition. The BAND 228 will further produce a request for reset signal to the FORM 210, ENC 208, and CON 230 integrated circuits in order to reset the SLUT 232 table, and to configurate the appropriate run-time attributes.

More preferably, the BAND 228 is further comprised of a user/application interface element connected to the FORM 210, ENC 208, and CON 230 integrated circuit which receives a plurality of signals regarding user/operator preference or application-specific requirements, it then send these signals to the processor element and dynamically produce a plurality of optional run-time attributes, the BAND 228 will further interact with the CON 230, FORM 210, and ENC 208 and to finalize the run-time attributes corresponding to the available communication bandwidth.

Further preferably, the BAND 228 will comprised of a inter-operation circuit connected to the RX 220 and TX 222 integrated circuit which receive a inbound document signal from RX 220 according to a SLUT 232 encoded document coding format, it then reset the SLUT 232 parameters and translate the inbound signal into a outbound signal according to another document coding standard, it further reformat the outbound signal and send to TX 222 for further transmission.

L. System Controller (CON)

The CON 230 (system controller) integrated circuit is able to control and coordinate individual subsystem pipeline operations, to maintain and manage overall data throughput, and to sensitize and to adapt with external application, user, networking conditional branches. The CON 230 is also able to initiate, maintain, and update a set of run-time executable system look-up-tables (SLUT's 232), and to facilitate static task prescheduler and look-ahead instruction presequencer corresponding to the specific input document data types. The CON 230 is further able to provide run-time coordination among individual subsystems and to configure each subsystem's pipeline function to maintain automatically scalable system performance.

The CON 230 is comprised of dynamic data storage and retrieval circuit that is comprised of a single or plurality of system look-up-table (SLUT 232). There is also interface circuit connected to PREP 202 which receives a differential frame bit-map signal corresponding to the specific input data types, said SLUT 232 then cross reference said signal and produce a set of run-time parameters including, but not limited to: compression ratio, frame rate, and display resolution. The CON 230 is further comprised of a task prescheduler circuit connected to SLUT 232 and every internal DISC 112 pipeline subsystems which further translate the selective run-time SLUT 232 parameters into a specific set of run-time encoding, decoding, and frame updating instruction sequences for the corresponding pipeline ENC 208, DEC 206, and POST 204 integrated circuits.

More preferably, the CON 230 is comprised of a scalable system control circuit which receive and analyze each pipeline subsystem's performance capability and produce selective internal data format to accommodate the available processor, transmission, and storage bandwidth and power requirement. Said system control circuit is comprised of a dynamic system configuration circuit which sensitize internal run-time intermittent critical-paths, temporary power shortage, subsystem data grid-lock, networking conditions changes, change of priority, user preference changes, and application requirement change. Said controller also include run-time pipeline synchronization circuit which sensitize and register the abnormal instances for all DISC 112 subsystem's pipeline operations, and send a system-wide alert signal while requesting for further fine-tuning of the SLUT 232 (system look-up-table), the CON 230 would examine the bottlenecked subsystems, identify their overload causes, and then authorize alternative SLUT 232 parameters to temporarily scale down the specific subsystem performance requirement, the CON 230 will also issue a selective set of control signals including, but not limited to: task redirection, conditional branch insertion, data reformatting, NOP insertion, threading, or delay branching to adjust the specific overloaded subsystem. The CON 230 will also issue alternative DISC 112 internal data format to temporarily relieve system's performance requirement and still to maintain the overall system throughput. When said emergency condition is relieved, CON 230 issue system wide acknowledgment signal and resume overall pipeline synchronization and operation.

4. Functional Operation

FIG. 8 illustrates the preferred functional principle, operations and methods for the design and implementation of a DISC 112 integrated circuit computer and communications system. The DISC 112 is particularly characterized by its ability to handle high order compound document object-directed task execution directly in hardware in file format at high rates of speed, and it can be better understood by considering the operation routines used in the present invention. It is worth mentioning that, instead of focusing on the specific implementation and apparatus, we intend to address all the critical methods which are required for a generic DISC 112 system realization. It is equally our intent that, as dictated by the particular user, application, and/or networking requirement, these methods can be applied toward implementation in a plurality of technologies other than integrated circuit.

A. Document-Directed Task Execution

Contradictory to the traditional RISC and CISC principle, which primary focus have been strictly on the run-time program control and run-time memory management in order to optimize for computation intensive application. DISC 112 requires the retrieval, compilation, and evaluation of receiving document data and the proper match with initial set requirement and subject of interest from selective application, user, and/or network environment prior to any of the corresponding run-time execution steps can be issued.

Consider first the Document-Directed Task Execution routine, in the presently illustrated embodiment, DISC 112 comprise operation means in PDB 226 (personal database) which organize and manage object-oriented data structure for personal knowledge. It is also comprised of operation means in FORM 210 which query, select and establish subject of interest corresponding to specific user, application, and/or network requirement, said FORM 210 is further comprised of operation means to issue document request. There is also a operation means in DEC 206 which accurately decode receiving document and convert into DISC 112 internal format. Said FORM 210 is further comprised of query and comparison means which search through all possible reference resources and analyze and identify the most suitable target material. Said FORM 210 is also comprised of compilation means which parse receiving target document into selective segmented scripts. There is further operation means in SMART 212 which produce a single or plurality of executable and non-executable tokens corresponding to said segmented script, wherein said non-executable token is further stored in a operand stack means in SMART 212, said executable tokens is translated into a procedural or functional pointer in SMART 212, DISC 112 is further comprised of operation means in REF 216 which further reference said procedural and/or functional pointer with a build-in dictionary and/or system look-up-table (SLUT 232) in CON to fetch and select the appropriate opcode operating sequence. DISC 112 is further comprised of operating means in CON (system controller) which further store and fetch said opcode from a opcode stack, and further authorize operating means in REF 216 (referencing processor) and EVAL 214 (evaluation processor) to execute corresponding procedural and/or functional steps specifically for said retrieved target document. Furthermore, DISC 112 is comprised of operating means in CON which dynamically update said SLUT 232 (system-look-up-table) content to accommodate run-time user, application, and network conditional changes.

This significantly improve the cost performance for document-directed database retrieval and task processing applications. Comparatively, prior arts in accordance with traditional RISC or CISC methodologies have only shown incremental improvement on individual or selective group of computation-intensive tasks such as document compression/ decompression, and bandwidth operability for selective networks.

B. Object-Oriented Knowledge Management

A method is implemented in the circuitry of FIG. 8 to perform object-oriented personal knowledge management by machine hardware. The DISC 112 is comprised of operating means in PDB 226 (personal database) which store, update, and retrieve personal knowledge content. There is also operation means in PACK 218 that is comprised of OIF 224 (object interface) circuit which receive knowledge content inputs from external user, API 302 (application programming interface) and/or COP 304 (coprocessor). Said PDB 226 is further comprised of operating means which establish Behavioral Model of said input knowledge that is comprised of Class Netlist, wherein each Netlist is further organized as sequence of class descriptors with associated pointers to the prior hierarchy (source) descriptor and the next hierarchy (destination) descriptor, said Netlist provide proper description for said input knowledge content. The DISC 112 is further comprised of stack operation means in PDB 226 that is comprised of a single or plurality of Class Lib (Class Library) which store said class descriptors and corresponding source and destination pointers for further knowledge retrieval.

There is also operation means in PDB 226 which perform correlation among object and formulate composite Object Group. Said Object Group can be entered into Class Lib to establish higher class hierarchy. Furthermore, each said Class Lib elements is assigned a unique Object ID (object identification) which interface with external user, application, and/or network through said OIF 224 (object interface). There is also a operation means which select appropriate set of OIF 224 to correspond and match with external subject of interest (SOI). DISC 112 is further comprised of interface operation means in REF 216 which access Class Lib and produce selective procedural and functional pointers corresponding to said personal knowledge content.

C. Compound Document Retrieval and Compilation

Compound document retrieval and compilation is performed in a circuit of FIG. 8. This method makes DISC 112 possible to retrieve, interpret, substantiate, correspond, and maintain a multitude of compound document objects over a wide range of communications networks. Furthermore, DISC 112 requires and provides additional real time performance for query, reasoning, compilation, decoding, and interpretation of the incoming data streams prior to any instruction authorization or document execution.

DISC 112 is comprised of operation means in PACK 218 that is further comprised of OIF 224 circuit which retrieve input document data, said OIF 224 also receive run-time attributes corresponding to particular network, application, and user conditions. There is also operation means in BAND 228 which request and receive run-time network condition and determine the bandwidth allowance corresponding to a bandwidth look-up-table (BOLUT). There is further means in FORM 210 which interpret and substantiate said input document. Said means is first comprised of parser means which partition said document into the smallest independent internal unit that is comprised of segmented script modules. Said means is further comprised of Internal Link means which bind a plurality of internal unit together to establish larger external unit wherein each link corresponding to an internal procedural call. There is further External Link means which bind a plurality of external unit together wherein each external link corresponding to a external procedural call.

There is further pointer manipulation means in FORM 210 which produce offset pointer corresponding to each said segmented script, and a Optimize means in FORM 210 which rearrange procedural call sequences to optimize run-time performance. There is additional query means which request list of subject of interest corresponding to selective run-time user, application, and network environment. There is ENV. Point means in REF 216 which produce segment pointer for further retrieving the content of selective segmented scripts.

There is further stack means for storing run-time procedure and object sequences in REF 216 and EVAL 214 which further produce opcode and operand calling sequence corresponding to SLUT 232. There is further call return sequence in stored in SLUT 232 which provide look-ahead instruction pipeline.

As a result, the methodology for DISC 112 becomes intrinsically different. RISC or CISC's primary focus are to optimize run-time computation performance, i.e., instruction authorization, decoding, pipelining, arithmetic and logical execution, and memory control and management. Comparatively, all DISC 112 instruction groups are issued and executed to facilitate run-time document manipulation, and to conform specific application, networking, and user priority requests.

D. Adaptive Internal System Optimization

FIG. 8 illustrates the internal system operation of DISC 112 and in particular, the adaptive internal system optimization circuit of the present invention. The adaptive internal system optimization circuit employed in the present invention is comprised of the following steps:

Firstly, the step of allowing DISC 112 for 100% recognition for incoming document data through front-end data decoding subsystem and techniques, wherein prior arts in CISC and RISC only rely on traditional OCR (optical character recognition) techniques to compute, analyze, and recognize characters strings according to individual shapes and contours. As a result, the incoming data streams are decoded to selective internal DISC 112 optimized data format, which include but not limit to the 8 or 16 bit universal character encoding forms. The 8 or 16 bit universal character encoding forms have been used in the example, only for the purpose of clarity.

Secondly, the step of dynamically optimize individual subsystem performance and power consumption for all performance critical DISC 112 subsystems include but not limit to: document identification, manipulation, compilation, encoding and decoding, interpretation, storage and retrieval. Said subsystem optimization method is further comprised of a plurality of selective SLUT 232 (system look-up-table) which can accommodate a plurality of selective run-time conditional changes to conform specific application, networking, and user priority requests. Said optimizer is further comprised of instruction look-ahead prefetcher and group prefetcher in order to accelerate instruction processing.

Thirdly, the step of continuously monitoring run-time internal critical path, and reducing internal processing load through selection and setting of a coarser representation of internal data format and/or increase of clock speed for particular overload subsystem, said monitor further maintain balanced system-wide power and performance throughput, and resume normal internal data format assignment for said subsystem when critical path is unlocked.

Fourthly, the step of translating high level procedural and functional operation into directly executable intermediate high level language instruction set.

Fifthly, the step of organizing said directly executable instruction set in a call stack and a return stack, wherein call stack can optimize normal external procedural call entry, control, and set up of new activation record, the return stack can optimize exception handling including normal external procedural call return, control, and resume of a previous activation record.

Sixthly, the step of look-ahead control of said call stack and return stack, wherein controller can sequence through call stack during normal procedural flow, and identify forthcoming change of procedural/program control, and initiate and start simultaneously sequence through appropriate return stack location to maintain pipeline coherence.

Seventhly, the step of optimizing said intermediate high level language instruction set for selective set of popular host language which including, but is not limit to:

C, C++, and SQL. wherein said high level instruction set can be directly executed in a external DISC 112, CISC, or RISC machine without further compilation step required.

As a result, DISC 112 focus on performance optimization other than the traditional RISC and CISC run-time data computation. the RISC and CISC may offer superior performance for numerical intensive data computation, wherein DISC 112 is specifically optimized for document retrieval and subsequent procedural authorizations.

5. Architecture and Organization

The present invention incorporates a number of unique architectural properties in respect to the direct query, compilation, manipulation, management, and retrieval of compound document data types. The present invention also provides an unified microprocessor suitable for the direct operation and inter-operation among document-intensive system means including, but not limit to: personal communications, client-server computing, and multimedia database retrieval. Before describing these architectural properties in further detail, the internal data and system organization should be understood.

A. Hierarchical Procedure Engine

As shown in FIG. 7B and FIG. 9, the present invention is comprised of the following architectural means which compile, link, process, and manage single or plurality hierarchy of high-level-language procedural calls.

Firstly, the means of FORM 210 integrated circuit which partition application specification into a single or plurality hierarchy of independently executable modules. There is further means that partition each module into single or plurality of executable sub-modules.

Secondly, the means of SMART 212 integrated circuit which produce the corresponding call pointer data structure for each modules or sub-modules, wherein said data structure is comprised of procedure call stack and operand call stack, said procedure call stack is comprised of a sequence of next procedure pointer address which correspond with the next normal execution steps for said module, said operand call stack is further comprised of the sequence of next data pointers which correspond with the local variables' scope for said modules.

Thirdly, the means of SMART 212 integrated circuit which produce the corresponding return pointer data structure for each modules or sub-modules, wherein said data structure is comprised of procedure return stack and operand return stack, said procedure call stack is comprised of a sequence of previous or alternative procedure pointer address which correspond with the conditional or exceptional execution steps for said module, said operand return stack is further comprised of the sequence of previous or alternative data pointers which correspond with the local variables' scope for the previous or alternative call modules.

Fourthly, the means of SMART 212 integrated circuit which produce the corresponding auxiliary pointer data structure for each modules or sub-modules, wherein said data structure is comprised of a single or plurality of auxiliary procedure stack and a single or plurality of auxiliary operand stack, said procedure stack is comprised of a plurality sequence of previous and next procedure pointer, for example: N−2, N−3, . . . , and N+2, N+3, . . . , wherein N represent the present procedure. Said operand stack is further comprised of a plurality sequence of next, previous or alternative data pointers which correspond with the local variables' scope for the call destination modules.

Fifthly, the means of SMART 212 integrated circuit which produce the corresponding bit mapping logic for monitoring each module or sub-module's execution, wherein said bit map logic look-ahead monitor and foresee either conditional or exceptional procedural steps are arriving or change of activation record is required, then said logic further locate and prefetch appropriate procedure pointer and data pointers to maintain pipeline coherence.

B. Object-Oriented Transaction Processor

As shown in FIG. 4, the present invention is comprised of the following architectural means which compile, link, and manage single or plurality of object and class and method library through setup and termination of the corresponding procedural call modules:

Firstly, pointer means for defining and unique identifying object which correspond with single or plurality of application module or sub-module, wherein said object represent a particular subject of interest from the user, application, or network. There is also pointer means for further defining and identifying sub-object which represent more detailed subject of interest, wherein said sub-object locate at the next lower level of this object hierarchy. There is further pointer library means which list all the available object and sub-object with proper hierarchy level identifier. There is further pointer register and/or stack means which record the properly selected execution path from user, application, and/or network that is further comprised of sequence of object and sub-object each with corresponding hierarchy identifier.

Secondly, pointer means for defining class, wherein said class correspond with high-level behavioral descriptor of a object. there is also means for defining a plurality of sub-class which selectively inherit a complete or subset of global properties from its parent, wherein each subclass correspond to a particular user, application, and/or network run-time environmental specification. There is further means for overwriting the global properties inheriting from its parent during run-time environmental condition changes. Furthermore, there is also class library means which list all the available class which can be selected by application, user, and/or network.

Thirdly, pointer means for defining a method library, wherein said method library correspond with single or plurality of function, procedure, and/or subroutines which can be invoked at the user, application, and/or network request in order to manipulate said object. Said pointer means is further comprised of referencing means which correspond with system look-up-table (SLUT 232) that can be update and download corresponding to run-time application, user, and network requirement.

Fourthly, pointer means for defining single or plurality of message interface port, wherein said message pointer descriptor means correspond with single or plurality of internal or external procedure calls which can be established to interface with said object. Said message pointer is also comprised of logic means which look-ahead, prepare, and prefetch the required value or reference location for a selective set of parameters and/or arguments which is required to be transported from caller to callee for all the forthcoming procedural calls.

Fifthly, application-specific compiler means for selecting the appropriate assembly of class, object, methods, and message from the library and correspond to application-specific run-time requirement from user, application, and network. Said compiler means further comprised of logic means which communicate with the system controller (CON) integrated circuit and select a particular set of system look-up-table (SLUT 232) which meet real time performance requirement for said application.

Sixthly, pointer means for defining polymorphism for said object wherein said pointer support a selective set of data types including, but not limit to data, voice, image, graphics, ink, and video. Said pointer apply the designated data types corresponding to requirement and run-time constraint from user, application, and network.

Seventhly, circuit-switched transaction execution means in PACK 218 integrated circuit which allocate single or plurality of time slot and assign each single or aggregate slot for the designated transaction processing task correspond with said object, class, method, and messages, wherein said means cooperate with said run-time attribute control means to prefetch and determine the appropriate system look up table which guarantee to perform deterministic multi-tasking, said means further maintain data persistency wherein permanent data set will not be updated or modified until the transaction is completed. In order to further maintain system throughput, there is a state machine means which continuously monitor and issue the invocation and termination of each normal, conditional, and exceptional transaction and branch to alternative execution path when run-time condition changes arises.

C. Client-Server Protocol Kernel

As shown in FIG. 7B and FIG. 9, the present invention is comprised of the following architectural means, which allow for real-time performance of multiple layered protocol functions including, but not limit to, data formatting and program flow control, for integrated operating systems that include application programming interface and network communication capability. Said protocol kernel is designed to simplify hardware implementation and to optimize operating system performance in distributed client-server environment.

Firstly, the means for operating system to receive run-time request for performing a selective set of protocol functions, wherein each of the protocol functions is assigned with an integer n that can be ranged from 1 to N, N is the integer representing the highest protocol layer determined by the operating system to implement these run-time callable protocol functions. For each particular layer n, the operating system further examine, partition, and schedule the run-time execution order for each of the assigned protocol function embedded in that layer. As an example, when the operating system receives request to perform OSI standard during a particular run-time environment, the system will determine the highest protocol layer as 7, and make the following assignment:

| 1. Application Layer,  | n = 7 |
| 2. Presentation Layer, | n = 6 |
| 3. Session Layer,      | n = 5 |
| 4. Transport Layer,    | n = 4 |
| 5. Network Layer,      | n = 3 |
| 6. Link Layer,         | n = 2 |
| 7. Physical Layer,     | n = 1 |

Secondly, the means of a processor kernel which execute selective set of layer n protocol functions. Said kernel is comprised of a program memory that receive and store the required receiving and transmitting function sequence for protocol layer n. There is also a data path processor that is comprised of transmitting data path processor and receiving data path processor which further execute designated layer n protocol function corresponding to selective transmitting and receiving instruction sequence retrieved from said program memory. There is further buffer means that is further comprised of input transmitting buffer, output transmitting buffer, input receiving buffer, and output receiving buffer. Said input transmitting buffer first request, acknowledge, and receive outbound data from the output transmitting buffer of next higher layer n+1, it then transfer data to said transmitting data path processor to perform the designated sequence of protocol functions including data formatting required within layer n, it finally transmit the resulting data to input transmitting buffer of next lower layer n−1. Reversely, said input receiving buffer first request, acknowledge, and receive inbound data from the output receiving buffer of the next lower layer n−1, it then transfer the data to said receiving data path processor to perform the sequence of designated receiving protocol functions including data deformation within layer n, it finally transmit the resulting data to input receiving buffer of next higher layer n+1.

Thirdly, control means which define program control schedule for a designated protocol layer n. Said control means is comprised of state machine means which interpret and maintain and control the program procedural flow within protocol layer n, there is also a scheduler means that schedule, determine and maintain a sequential or parallel implementation of said program procedural flow.

Fourthly, load control means which define the system throughput for transmitting outbound and receiving inbound data. Said control means further comprised of iteration, cascading, parallel, and arbitration modes. Said iteration mode set the default and allow for single DISC 112 device to sequentially perform layer n functions from 1 to N or vise verse at a particular time slot. Said cascading mode allow multiple DISC 112 devices to operate in pipeline. For example, OSI protocol will require seven DISC 112 devices to cascade together wherein each is responsible for one of the seven protocol layer function. Said parallel mode allows for multiple DISC 112 device to operate for layer n protocol in parallel. Finally, said arbitration mode allow for single or multiple DISC 112 devices to dynamically arbitrate and select the appropriate time slot aggregates or protocol functions for each of the DISC 112 processor element to maintain consistent overall system throughput.

Fifthly, means for defining procedure stack for the designated protocol layer n. Said procedure stack comprises register or stack means which simultaneously retain selective set of previous, present, and forthcoming procedures corresponding to all potential regular, conditional, and abnormal program execution. There is also a program control means which look-ahead and foresee conditional branch, external call or other exceptional situations and switch to appropriate stack pointer location to maintain pipeline consistency.

Sixthly, means for defining operand stack for designated protocol layer n. Said operand stack comprises register or stack means which concurrently retain selective set of previous, present, and forthcoming activation records corresponding to all potential regular, conditional, and abnormal program execution. There is also a program control means which look-ahead and foresee conditional branch, external call or other exceptional situations and switch to appropriate stack pointer location to maintain pipeline consistency.

Seventhly, pointer means for defining remote procedure call which send request to solicit external DISC 112 device to perform the required forthcoming protocol procedures and/or to update to the forthcoming activation record wherein said controller foresee the internal DISC 112 device will become overloaded due to run-time condition changes request received from user, application, and/or network.

D. System and Program Abstraction

As shown in FIG. 7B, FIG. 8, and FIG. 9, the present invention is comprised of the following architectural means, which allows for real time abstraction of the external system and program. Said system abstraction means allows for DISC 112 to perform time-critical microkernel functions for external operating system and database management system and to collaborate with multiple external DISC 112 device for planning and scheduling local and remote procedural calls in enterprise-wide workgroup computing. Said program abstraction means further allows for software developer to prototype and produce direct executable object code with built-in security of selective encapsulation and coding for its high level language source code.

Firstly, the means for system abstraction layer (SAL) which allow for the internal controller (CON) to perform time-critical microkernel functions for a plurality of external operating system and database management system, that include, but not limit to: UNIX's, NT, OS2, WINDOW, DOS, and alike. Said SAL layer selectively correspond external system's microkernel messages with internal system's command, control, and communication protocols and procedures via TX 222, RX 220, and PACK 218, said time critical microkernel functions include, but not limit to: execution and scheduling for multiple threads, synchronization for multiple process, and translation and mapping for high-level system objects.

Secondly, the means for supporting language-specific interpreter in CON, wherein high level source language procedures selectively translate to its most optimized object code that is directly run-time executable, said means further comprises microprogram memory means within CON which store, select, and retrieve said interpreter code.

Thirdly, the means of receiving a plurality of forthcoming procedural and/or protocol call messages from external operating system and database management (CON), buffering and preparing said call message sequence for internal processing (PREP 202), establishing pointer data structure for activation record and environmental pointer which correspond with said procedural and/or protocol call sequence (FORM 210), transferring said pointers to assemble run-time procedural call and return stack (SMART 212), interpret said high-level source procedures for calls and returns to selectively corresponding with selective microprogram interpreter code (CON), and formulate direct run-time executable object code (ENC 208).

Fourthly, the means of providing local and/or remote procedural or protocol call processor in CON which collaborate with single or plurality of external DISC 112 devices, wherein said procedural and/or protocol call processor send request signal when the internal functional resource for the forthcoming operation and/or transaction become unavailable, said call processor then hold said operation and/or transaction in wait sate until it further receive acknowledgment signal that identify and/or describe the external available functional resource, said call processor then initiate call set-up procedure with the external DISC 112 device and establish the selective pointer data structure for local activation record, environmental pointers, and the argument and parameters, said call processor further transfer program control to external callee in order to invoke the next operation and/or transaction, said call processor further prepare call termination and return procedures in preparation for the external device to complete the transaction and return program control with resulting data to caller. Said call processor further resume and continue operation and/or transaction after regaining program control.

Fifthly, the means for providing portable software module that is further comprised of said direct executable object code, selective high-level-language interpreter microprogram code, and local and/or remote procedural call schedule table.

Sixthly, the means for encapsulating said object code with selective layers and/or functions of control and maintenance protocol stacks (POST 204), wherein said encapsulated object code can only be decoded to source program with the appropriate decoding and/or decryption routine at the authorized receiver (DEC 206). Further, said encapsulated object code can be segmented into frame, packet, or cells, and be further relayed across the communication network (PACK 218, TX 222, RX 220) without protocol conversion and termination.

Seventhly, the means for code object abstraction layer (CAL) which provide universal binary program interface wherein resulting binary code can be selectively disseminated for plurality of run-time execution environment including RISC and CISC.

E. Single Chip Implementation

FIG. 9 illustrates the design example of a single chip DISC 112 integrated circuit, which provide an universal microprocessor solution for operation and inter-operation of desktop and handheld systems to perform selective compound document-intensive functions that include, but not limit to: copier, fax machine, printer, scanner, personal communicator, client-server computing, and multimedia database retrieval. We also include built-in architectural support for all kernel functions of compound document computing on chip, therefore provide cost performance advantage and allow for software to expand on high level applications for compound document computing.

For illustration purpose, we have implemented our design on a single chip integrated circuit. However, same design principle can be equally applied and implemented on multi-chip-module or any other viable or equivalent means.

The diagrammatic representation illustrated in FIG. 9 comprises a suite of system components to function in a distributed client-server computing environment. A server will typically require a single or plurality of the higher performance system component wherein client may only require a selective subset. These system component are: preprocessor (PREP 202), encoding processor (ENC 208), postprocessor (POST 204), decoding processor (DEC 206), formatting processor (FORM 210), object smart memory (SMART 212), evaluation processor (EVAL 214), referencing processor (REF 216) packet processor (PACK 218) that further include object interface (OIF 224), transmission processor (TX 222), receiving processor (RX 220), personal database (PDB 226), bandwidth controller (BAND 228), and system controller (CON) that further include system look-up-table (SLUT 232).

These system components are interconnected on-chip through a single or plurality of SYSTEM BUS and CONTROL BUS. The CONTROL BUS allows for SMART 212, CON, BAND 228, and SLUT system controllers to communicate with each other and to transceive control signals to the remanding data path processor including PREP 202, POST 204, FORM 210, ENC 208, DEC 206, EVAL 214, REF 216, PACK 218, and PDB 226. The SYSTEM BUS provides internal data transfer which further comprise a plurality of BUS TRANSFER modes, wherein standard DEFAULT mode allows for PACKET SWITCHED signal transportation of data, control, and operation maintenance packets among various system components, a plurality of CIRCUIT SWITCHED modes also allow for burst transportation of full frame, partial frame, live motion objects, graphics overlay, or other compound DISC 112 data types. Both SYSTEM BUS and CONTROL bus provide bidirectional parallel transfer.

Due to the real time requirement for performing synchronous frame based compound document processing, a single or plurality of system-wide pipeline can be designed. For example, a local signal communication pipeline which comprises direct connection between PREP 202-ENC 208 FORM 210 and POST 204-DEC 206-FORM 210 to maintain local signal throughput, a application priority pipeline which comprises of direct connection between PDB 226-BOLUT (BAND 228)-SLUT 232 (CON)-FORM 210-OIF 224 (PACK 218) to maintain run-time conditioned throughput upon user, application, and network request. Finally, remote signal communication pipeline which comprises direct connection between the RX 220-PACK 218-TX 222, PACK 218-SMART 212-FORM 210, and DEC 206-FORM 210-ENC 208 to maintain remote communication throughput. In order to facilitate pipeline connections, first-in-first-out memory devices are inserted where appropriate. Private buses are provided between RX 220-PACK 218, PACK 218-TX 222, FORM 210-SMART 212, FORM 210-PREP 202, FORM 210-POST 204, ENC 208-DEC 206, OIF 224-PDB 226, SMART 212-EVAL 214, and SMART 212-REF 216.

The diagrammatic representation illustrated in FIG. 9 comprises the following input/output. For server implementation, they are 32 bit data input pins, 32 bit data output pins, 32 bit application parallel input/output (PIO) pins, 24 bit tag/control input/output pins, and 8 bit serial communication input and output (SIO) pins. For a low cost client, the above input/output can be significantly reduced and time multiplexed.

The first group of 32 data input pins connected to PREP 202 which receive four set of individual eight-bit digital compound document input data, i.e., red (R), green (G), blue (B), and character (K). These input pins can be further time multiplexed to receive additional address, status, tag, control, timing, and interface signals. They can also load program and data directly from off-chip.

A second group of 32 output pins connected to POST 204 which produce four sets of eight-bit output signals for external display, printing, or fax. These output pins can be also time multiplexed to transmit internal address, status, tag, control, and interface signals, and to export program and data directly to external memory.

The input and output data ports can further be multiplexed to form a single group of 32 bi-directional input/output pins in a baseline implementation. Furthermore, additional input and output pins can be included for transporting address, tag, control, status, and other miscellaneous signals.

There is a third group of 32 bi-directional parallel input/output (PIO) pins connected to PDB 226, which is multiplexed to import and export a plurality of control and data signals including but not limited to: application and system control commands, priority requests, application requirements, communication and status messages, and program and data sequences.

For a more baseline implementation, PIO can be reduced to 8 or 16 pins for lower post packaging. Reversely, PIO can also be expanded to 64 or higher for higher performance implementation. PIO can further be connected to a time-division-multiplex (TDM), packet-division-multiplex (PDM), local bus interface (LBI), or small computer system interface (SCSI) circuits to facilitate the high speed burst transportation.

There is further a fourth group of 24 tag and control input and output pins connected to the SLUT 232 and CON, which provides the required power, ground, clocking, timing status, control and tag signals. The pins numbers can be modified according to system performance requirements.

There is further a fifth group of 8 serial communication input and output (SIO) pins connected to the RX 220 and TX 222, which simultaneously receives and transmits four channels of full-duplex document signals. The SIO pins numbers can be modified to meet application requirements.

The PREP 202 integrated circuit is comprised of document preprocessors with a optional motion processor, which receives analog or digital document, graphics, or still images and generate FRAME DIFFERENTIAL BIT MAP, MOTION VECTOR, and MACROBLOCK profile for each input frame.

The CON is comprised of SLUT 232 circuit which receives FRAME DIFFERENTIAL BIT MAP from SMART 212 and produce a run-time bandwidth profile for each input frame including compression ratio, frame/scroll rate, and display resolution. The CON is also comprised of a INSTRUCTION LOOK-AHEAD circuit which receive a GRANT signal from BAND 228 and translate the run time bandwidth profile into a group of predefined instruction address pointers. The CON is further comprised of a GROUP INSTRUCTION PREFETCH circuit which receive the instruction pointers and produce a sequence of run-time executable instructions for the input frame.

The BAND 228 integrated circuit is comprised of a BWREQ circuit which receive the FRAME DIFFERENTIAL BIT-MAP from PREP 202 and produce a run-time bandwidth requirement (BWREQ) signal for each input frame. The BAND 228 is also comprised of BWCAP circuit which during the DISC 112 system initialization (SETMODE), receives a set of bandwidth constraints relating to internal processing and storage and external communication. The BAND 228 is further comprised of a BWALLOW circuit which compare the system bandwidth constraints with the BWREQ signal and determine whether the DISC 112 system has sufficient run-time bandwidth. Provided bandwidth is sufficient, the BAND 228 will generate a GRANT signal to CON in order to enable the SLUT 232 to search and prefetch the run-time instruction sequences. Provided the bandwidth is insufficient, the BAND 228 will issue a CONDITIONAL BRANCH and request the FORM 210 to reformat the input frame and further reduce the run-time bandwidth requirement.

For compound document including motion video, the FORM 210 is comprised of a OBJECT ID circuit, which receives standard MACROBLOCK subimages from PREP 202 and produce a list of moving objects for each input frame. The FORM 210 is also comprised of a PRIORITY ASSIGN circuit which evaluate application requirement from OIF 224 and communication constraint from BAND 228 and assign the appropriate run-time priority level to each moving object and MACROBLOCK subimage. Provided the run-time bandwidth is insufficient, the FORM 210 is further comprised of an X-Y INTERPOLATE circuit which receive MACROBLOCK subimages, moving objects, and their associated run-time priority levels and produce a reformatted MACROBLOCK subimage and moving objects. When the run-time bandwidth is proven to be sufficient, the FORM 210 is further comprised of DATA TRANSFER circuit which transfer the formatted macroblock subimage to ENC 208 and PACK 218 for further processing.

The ENC 208 is comprised of a programmable ENCODING circuit which receive input macroblocks and generate JPEG, MPEG, H.261, VQ, or alike encoded document tokens depending on the application requirement. The ENC 208 circuit also perform all pixel domain and transform domain encoding functions.

The PACK 218 is comprised of a PACKETIZER circuit which receives internally reformatted macroblock subimage and further partition into a plurality of data packets. The PACK 218 is also comprised of a PACKET CONTROL circuit which produce required control messages for both internal and external data movement, error detection and correction, and flow control management functions. The PACK 218 is further comprised of a PACKET/CIRCUIT BUS INTERFACE circuit which program the internal bus into a packet switch mode or a selective high speed burst circuit modes for the transportation of moving objects, macroblock subimages, or full frame images.

The SMART 212 is comprised of a SCALABLE OBJECT MEMORY ARRAY which receives data packet from PACK 218 and automatically self-configurate into a plurality of internally formatted object entities for storage. The SMART 212 is also comprised of a REFORMAT circuit which receive run-time bandwidth constraint from BAND 228 or receives a run-time application priority request from OIF 224 and self configured to the appropriate data storage format conforming to these run-time networking and application requirements. The SMART 212 is further comprised of a FOREGROUND PROCESSOR circuit which transceive, prioritize, manipulate, and store foreground data objects. The SMART 212 is further comprised of a BACKGROUND PROCESSOR circuit which can transceive, prioritize, manipulate, and store background data macroblocks.

The REF 216 is comprised of a DATA REFERENCING circuit which generates the address pointer reference list for data storage and retrieval. The EVAL 214 is comprised of DATA MANIPULATION circuit which rotate, linear shift, enlarge, or reduce the specified data object. The PDB 226 is comprised of a SIMULATOR circuit which generate instruction sequences for visualizing artificial knowledge and object data movement.

The TX 222 and RX 220 are comprised of a pair of TRANSCEIVERS circuit which import and export compound document data. The TX 222 is also comprised of an QUERY circuit which produce a REQUEST signal to inquire external networking and bandwidth stability conditions. The RX 220 is also comprised of an INTERPRETER circuit which receive and decode external networking and bandwidth control information and produce a ALERT signal to BAND 228 when abnormal networking conditions take place.

For compound document that requires motion video, the DEC 206 is comprised of a programmable ENCODING circuit which receives encoded macroblock tokens and generate JPEG, MPEG, H.261, VQ, or alike macroblock pixel images corresponding to the application specification. The DEC 206 circuit further perform all pixel domain and transform domain decoding functions.

The POST 204 is comprised of a plurality of analog and digital post processors. For compound document that requires motion video and animated graphics, POST 204 receives digital decoded document pixel runs and generate the appropriate formatted signal for NTSC, PAL, SCAM, RS-170, G3, G4, or EPS.

The OIF 224, as part of the PACK 218, is comprised of a INTERFACE circuit, which receives application priority requirements from user, application, and/or network and produce the appropriate message signal to FORM 210 in further assigning the run-time priority levels for each object and subimage. OIF 224 is further comprised of DRIVER circuit which allow direct interface with a plurality of external commercial DOS, UNIX, WINDOW, NT, or OS2 application programs. OIF 224 is also comprised of a programmable BIOS circuit which direct execute under a commercial operating system.

The BOLUT, as part of BAND 228, is comprised of a set of system LOOK-UP-TABLE logic circuits which dynamically produce a plurality options for compound document data type selections. The BOLUT is also comprised of a PRIORITY SENSITIZER circuit which receive RUN-TIME APPLICATION PRIORITY request signal from OIF 224 and produce appropriate set of run-time media profile for further execution.

6. Summary and Advantages

Each of the above aspects of the invention, when taken together, result in a significant improvement in the integrated circuit design of document data processors. The document processor of the present invention provides an optimized hardware system kernel for compound document processing functions for a wide range of business, commercial, consumer, communication and industrial system applications; it also provides an unprecedented level of capability, safety, and reliability with high performance and low cost, to make it suitable for many desktop, handheld, and embedded system implementations. Document processing is distinctively different from data computation and does not require intensive arithmetic operation, due to the fact that RISC and CISC do not provide direct architectural support for these kernel functions, most applications need to implement these in software and suffer performance bottleneck. Although the advancement of RISC and CISC have made significant improvement on general purpose data computation through their built-in architectural support, all document applications can only be incremental improved through linear increase of the system clock speed. Further, The present invention is characterized by the fact that all compound document data types are converted to an optimized internal file format, wherein the entire internal data path is built around this internal format to gain maximum throughput.

The present invention pertains to a plurality of integrated circuit design methods based on the novel system architecture concept of Document-Instruction-Set-Computing (DISC). It also provide an universal microprocessor integrated circuit for the operation and inter-operation of all desktop and hand-held systems for compound document computing which include, but not limit to, personal communication devices, copier, printer, scanner, pager, scanner, digital TV, videophone, and multimedia retrieval. It is further designed in mind the evolution and planning for a plurality generations of these DISC microprocessors.

The present invention is comprised of a plurality of functional units which independently execute the tasks of: remote communication, session management, and operating system kernel (PACK 218, RX 220, TX 222), run-time bandwidth conditioning and adaptation (BAND 228), application, network, and user run-time priority management (OIF 224), compound document data type management (PACK 218), universal document encoding and decoding (ENC 208, DEC 206), There is also a scalable formatter element (FORM 210) connected to the functional units which inter-operate arbitrary external document formats and intelligently adapt and select internal format corresponding to the system throughput and configuration. Additionally, there is a object smart memory element (SMART 212) connected to the functional units via scalable formatter (FORM 210), which access, store, and transfer blocks of document data based on the selective internal format, and perform compound document query, retrieval, and interpretation. The SMART 212 further access personal knowledge database (PDB 226) via OIF 224 and acquire run-time requirement from application, user, and/or network regarding specific priority list and subject of interest. The SMART 212 then issue high level procedure calls for directing document data retrieval (REF 216) or document data manipulation (EVAL 214). In the preferred client-server computing embodiment, while the functional units are preforming foreground execution of the DISC 112 application programs, the PACK 218, TX 222, and RX 220 are simultaneously performing background execution of the session control, remote communication, and operating system kernel protocols. Alternatively, the integrated circuit can further be comprised of motion-video-capable preprocessing circuit for (PREP 202), postprocessor (POST 204), encoder (ENC 208) and decoder (DEC 206) to perform motion video based compound document script. Furthermore, traditional RISC or CISC co-processor can be built-in or interfaced in order to perform data computation tasks.

To name a few, our present invention provides the following advantages:

a. It provide the architectural properties to support wide range of document-intensive system application. it also provides a universal microprocessor which can provide optimum performance to operate or inter-operate these desk-top, handheld, or embedded systems application, particularly in a distributed client-server computing environment. It can further provide Internal formatting and smart memory allocation for scalable performance.

b. It provides architectural properties to directly support hardware kernel protocol functions for client-server based operating system, session control, and remote communication, As a result, it directly run in DOS, WINDOW, NT, OS2, UNIX, or other mechanically equivalent operating system environments. It also directly support OSI, TCP/IP, ATM, ISDN or other mechanically equivalent communication protocols, and NetBIOS, LAN Manager, NetWare, VINE or other mechanically equivalent network operating systems and session control protocols.

c. It provides architectural properties to perform run-time bandwidth management and to conform with run-time user, network, and application-specific priority requirements.

c. It provides architectural properties to query, retrieve, and interpret document script, and to compile and produce high level language procedural modules conforming to run-time user, application, and network's subject of interest.

d. It provides architectural properties to produce direct executable high level procedures or instruction for referencing or manipulation of the compound document script, it further provide procedure-look-ahead and bit-map pointer stack techniques to maintain pipeline coherence, and apply group fetch, superscalar, and superpipeline to further enhance system performance.

e. Although it is equally capable of data computation task, in consideration of its lesser performance comparing with CISC and RISC, we provide the alternative to integrate or interface with traditional RISC and CISC circuit as functional coprocessors. Consequently, it can conveniently execute traditional DOS, UNIX, and WINDOW applications.

While our above description contains many specifications, these should not be constructed as limitations on the scope of the invention, but rather as an exemplification of one preferred embodiment thereof. Many other variations are possible. For example, a single chip implementation may further contains other still image processing circuits, or a parallel processor implementation can be provided to a ultra-high performance supercomputing server system. Furthermore, many exotic, untested embodiments and minor variations can be provided to further improve the processing speed for ENC 208, DEC 206, PACK 218, TX 222, RX 220, EVAL 214, REF 216, SMART 212, FORM 210. However, our intention has always been in the design of a low cost and yet upgradable integrated circuit solution for massive enterprise, consumer, communications, and desktop, handheld or embedded computing applications, and with the combination use of the method from our present invention, we have achieved integrated circuit chip of practical size and with sufficient speed and accuracy.

Accordingly, the scope of the invention should be determined not by the embodiment(s) illustrated, but by the appended claims and their legal claims.

We claim:

1. A system for integrated circuit for processing of external incoming document according to selective subject of interest request from user or application, wherein said subject of interest comprises data structure which comprising a single or plurality combinations of alphabets, character, numbers, sign, or codes, said document includes form, paper, memorandum, article, book, journal, computer program, or any other readable media, said integrated circuit provides connectivity with selective document processing, storage, and transmission machines, and comprises hardware architectural support for direct run-time execution of various-size block document data types, high level programming language, and database language construct, comprising:

means for internal operating system for managing and storage of a digital dictionary;

means for communicating with selective single or plurality user or applications for receiving, prioritizing, maintaining, and updating a collection of data structure defined by said user or application, said data structure representing particular subject of interest referring to a selective time period, wherein said data structure comprising a single or plurality combinations of alphabet, number, character, sign, or code, said means further selective scheduling, retrieving, means for producing, maintaining, and updating a collection of procedural call or instruction set for the run-time local or remote execution of each said user or application defined data structure, said means further comprising run-time hardware architectural support for direct execution of various-size document data types, high level programming language, and database language construct;

means for selective connecting with a plurality of external document storage, transmission, processing, printing, or display machines, said means requesting and receiving from said selective connected machines the entire or partial content of an external incoming document, which contain potential or relevant information to said user or application;

means for importing and parsing the entire or partial content of said incoming document for corresponding with selective page, paragraph, section, chapter, or other document organization means, wherein said importing content is in nature a variable size data block; said importing content is coded in selective printing or desktop presentation format;

means for formatting said incoming document content in accordance with an internal universal data representation format which correspond with single or plurality entities of alphabet or a single or plurality strings of alphabet, said means further selective reformatting said incoming document content for producing selective outgoing document content;

means for logical or physical searching for said string of user or application defined data structure within said incoming document content for the identification, determination or selection of set of proper match; and means for direct retrieving, interpreting and executing the corresponding procedural calls or instruction set for said matched user or application defined data structure for selective remote or local run-time manipulation, storage, or retrieval of said document content according to said subject of interest as directed by selective user or application.

2. A system for digital dictionary for editing, storage, updating, referencing, and retrieval of vocabulary data structure corresponding to selective subject of interest as defined by user or application, wherein said vocabulary data structure comprises selective single or plurality combination of alphabet, number, character, or code, said digital dictionary communicates with external document database, transmission, storage, or processing machines, and provide hardware architectural support for direct execution of various-size incoming document data types, high level programming and database language construct, comprising:

means for internal operation system data structure for creation, updating, maintenance, referencing, and management of a digital dictionary;

means for constructing a single or plurality of vocabulary for said dictionary, said means communicating with selective single or plurality user or applications for receiving, prioritizing, maintaining, and updating a collection of vocabulary data structure defined by said user or application, wherein each of said data structure comprising a single or plurality combinations of alphabets, numbers, or codes, and representing particular subject of interest for said user or application referring to selective time period, said means selective organizing, scheduling and retrieving said user or application defined data structure for run time execution;

means for producing, maintaining, and updating a collection of local or remote procedural call or instruction set sequence for the run-time execution of each of said user or application defined vocabulary data structure; said run-time execution allows the access, manipulation, storage, and retrieval of potential relevant various-size document data types according to high level programming or database language construct;

means for selective connecting with a plurality of external document processing, transmission, storage, printing, or display machines, said means further requesting and receiving from said selective machines the entire or partial content of an external incoming document;

means for importing and parsing the entire or partial content of said incoming document for corresponding with selective page, paragraph, section, chapter, or other document organization means, wherein said importing content is in nature a variable size data block; said importing content is coded in selective printing or desktop presentation format;

means for formatting said incoming document content in accordance with an internal universal data representation format which correspond with single or plurality entities of alphabet or a single or plurality strings of alphabet, said means further selective reformatting said incoming document content for producing selective outgoing document content;

means for logical or physical searching for said string of user-defined alphabet data structure within said incoming documents for determining or identifying a set of proper match; and means for direct retrieving, interpreting and executing said procedural calls or instruction set for said matched user-defined data structure for selective remote or local run-time manipulation, storage, or retrieval of said subject of interest for said document content, said means allows the hardware architectural support for direct execution of high level programing or database language instruction.

3. A system for the production, maintenance, and retrieval of selective user or application specific multimedia reference material for a generic text based document comprising:

means for input and storing the entire or partial contents of said generic text based documents;

means for producing, preserving, and retrieving the user or application defined data structure comprising a single or plurality combination of alphabets, character, sign, number, or code, wherein each of said combination represents a particular subject of interest for said user or application referring to a selective time period;

means for producing a selective multimedia representation or reference material for selective instances of said combination of alphabet, code, character, sign, or number, wherein each said instance correspond with selective user or application during a selective period of time;

means for producing identification or referencing means for selective secure access and retrieval of said multimedia representation for each selective instance of said data structure for each selective user or application; and means for run-time referencing of said selective multimedia representation for each instance of said data structure for each selective user or application.

4. A system for interconnecting document and multimedia processing equipment for efficient storage and retrieval, comprising:

means for input and storing the entire or partial contents of said generic text based documents from said document processing equipment;

means for producing, preserving, and retrieving the selective user or application defined text based data structure which comprising a single or plurality combination of alphabets, character, sign, number, or code, wherein each of said combination represents particular subject of interest for said user or application referring to a selective time period;

means for producing a selective multimedia representation or reference material for selective instances of said combination of alphabet, code, character, sign, or number, wherein each said instance correspond with selective user or application during a selective period of time, said multimedia reference material can be stored, accessed, or retrieved from said multimedia processing machine;

means for production, identification or referencing means for selective secure access and retrieval of said multimedia representation from said multimedia equipment for each selective instance of said data structure for each selective user or application; and means for run-time referencing of said selective multimedia representation from said multimedia equipment for each instance of said data structure for each selective user or application.

5. A system for an internal data structure for dynamic representation of an external computerized document, wherein said internal data structure can be memorialized, maintained, adjusted, and retrieved at a remote or local file or database storage, and said external computerized document can be directed according to run time transmission processing, and/or storage capabilities for presentation, publishing, printing, faxing, copying, or display, comprising:

means for document content description which comprises physical or logical representation of a single or plurality combination of alphabet, character, number, sign, or code;

means for document layout description which comprises:
    a. means for selective describing the physical or logical shape of each said alphabet, character, number, sign, or code;
    b. means for selective describing the physical or logical dimension of each said alphabet, character, number, sign, or code;
    c. means for selective describing the physical or logical orientation of each said alphabet, character, number, sign, or code;
    d. means for selective describing the physical or logical location of each said alphabet, character, number, sign, or code;

means for constructing internal data structure comprising said content description and said layout description;

means for memorializing, maintaining, and retrieving said internal data structure at a remote or local file or database storage location; said means further including a bandwidth control means for determining/adjusting the internal data structure for providing suitable document format, compression ratio, frame rate, and display resolution for each segment of said document script whenever the shortage of transmission, processing, and/or storage bandwidth occurs;

means for producing an external computerized document according to said internal data structure which can be directed for presentation, publishing, printing, faxing, copying, or display; and means for physical or logical identification or reference of said internal data structure from said external computerized document in order to further retrieve said internal data structure.

\* \* \* \* \*